Nov. 3, 1970         E. W. CARROLL         3,537,168
FULL AUTOMATIC FRAMING MACHINE
Original Filed Oct. 20, 1965          8 Sheets-Sheet 1
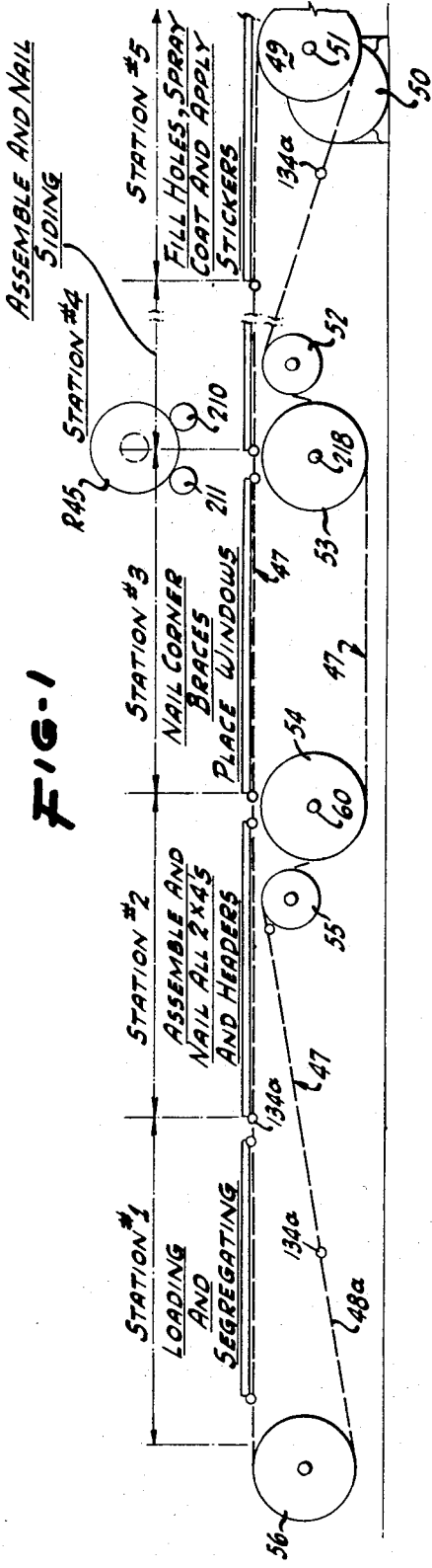
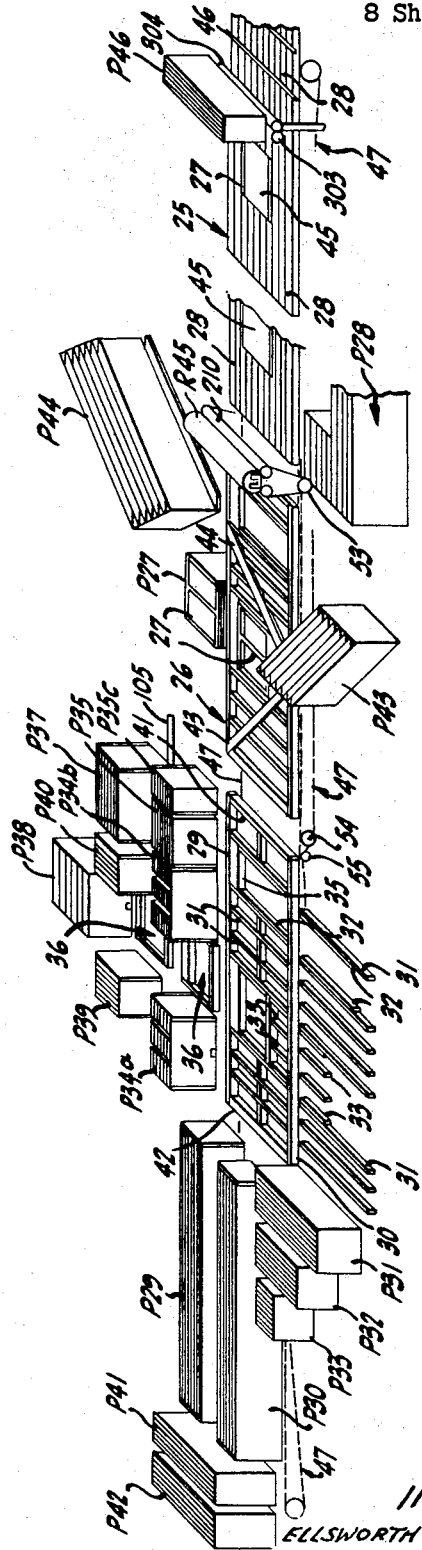
INVENTOR
ELLSWORTH W. CARROLL, DECEASED
HAZEL D. CARROLL, EXECUTRIX
BY Stanley Bralos
ATTORNEY

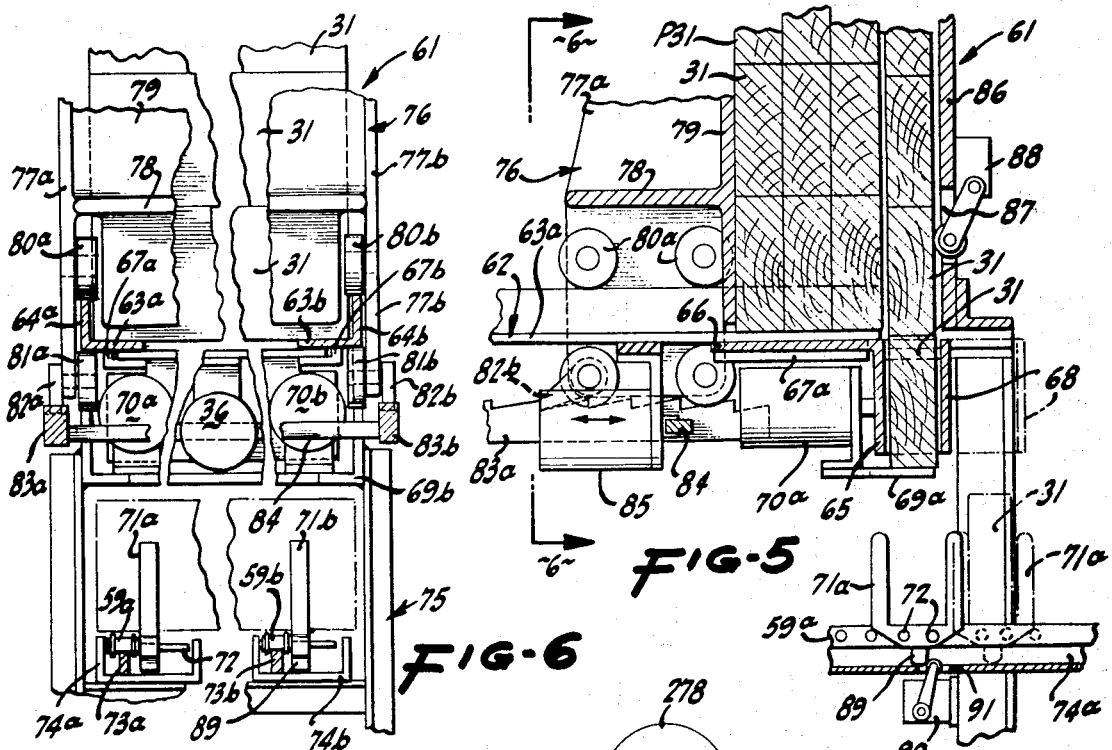
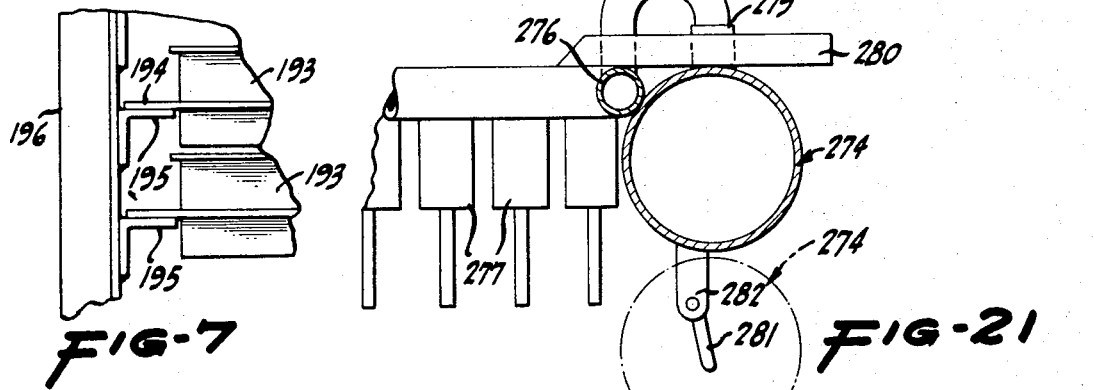
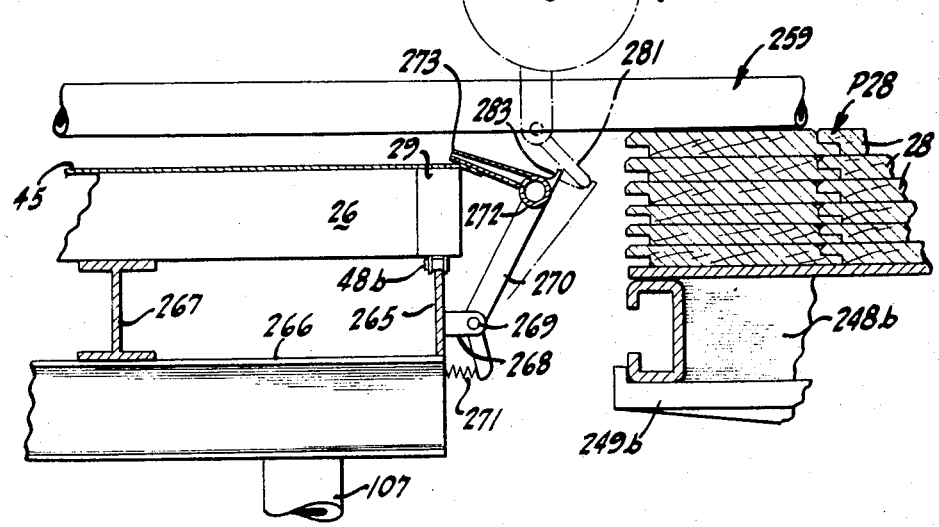

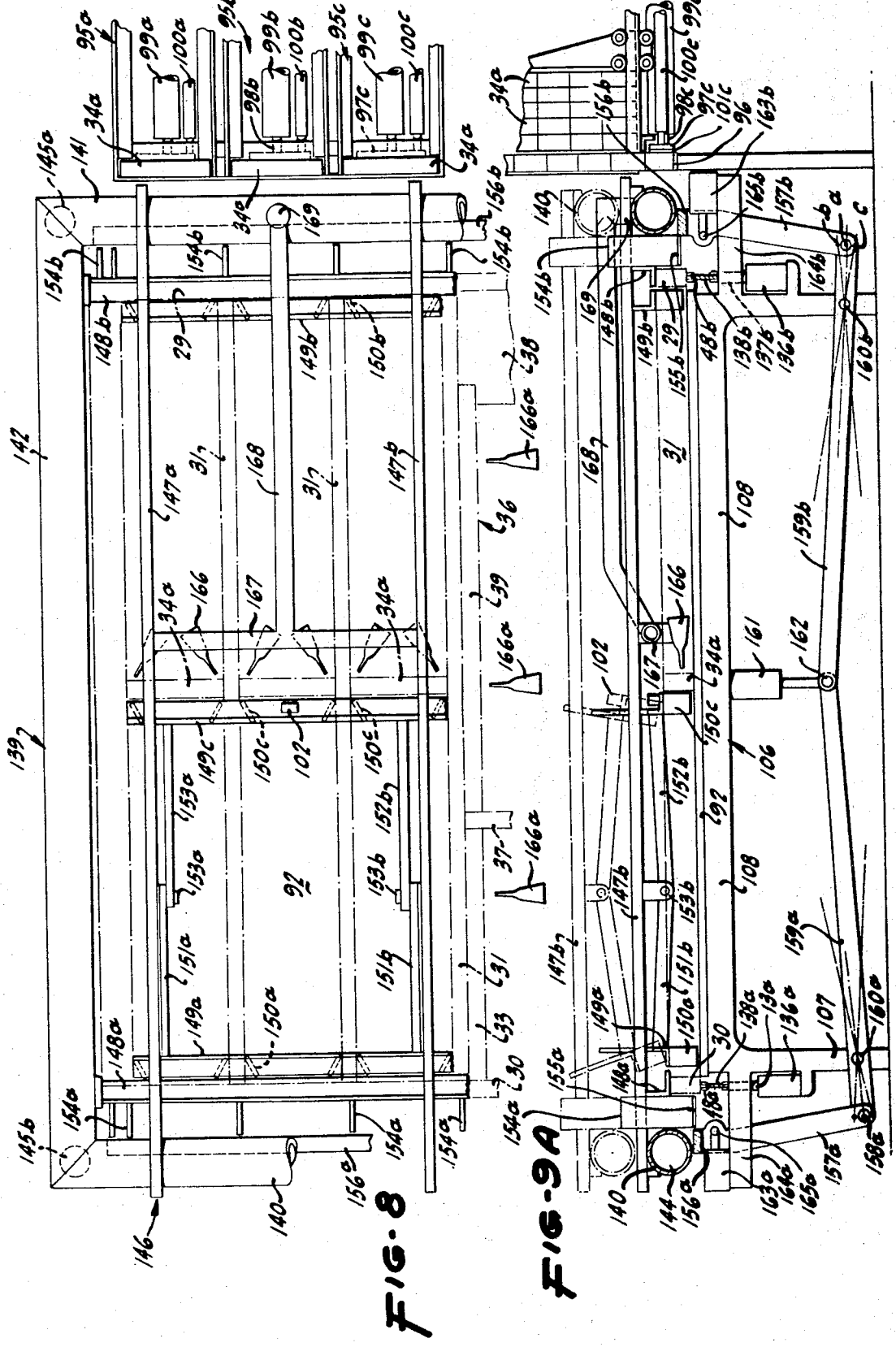

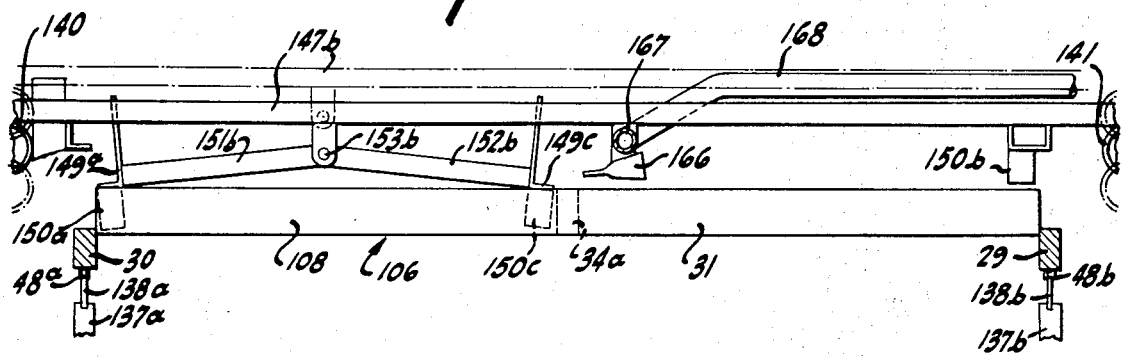
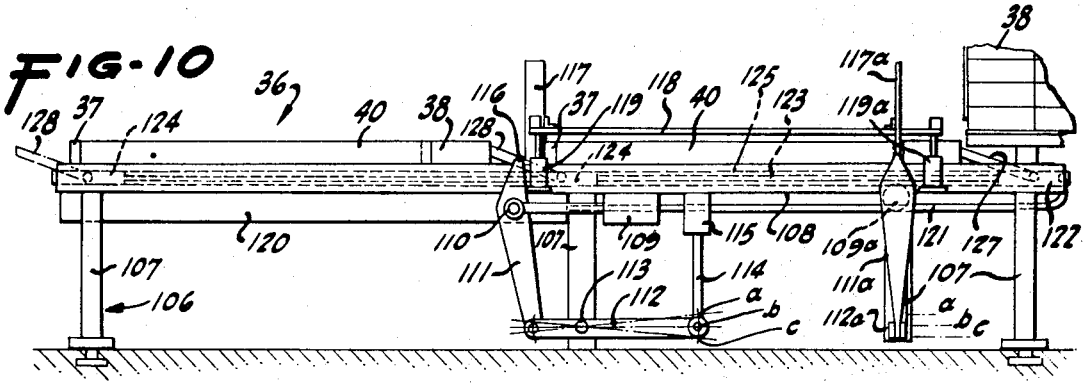
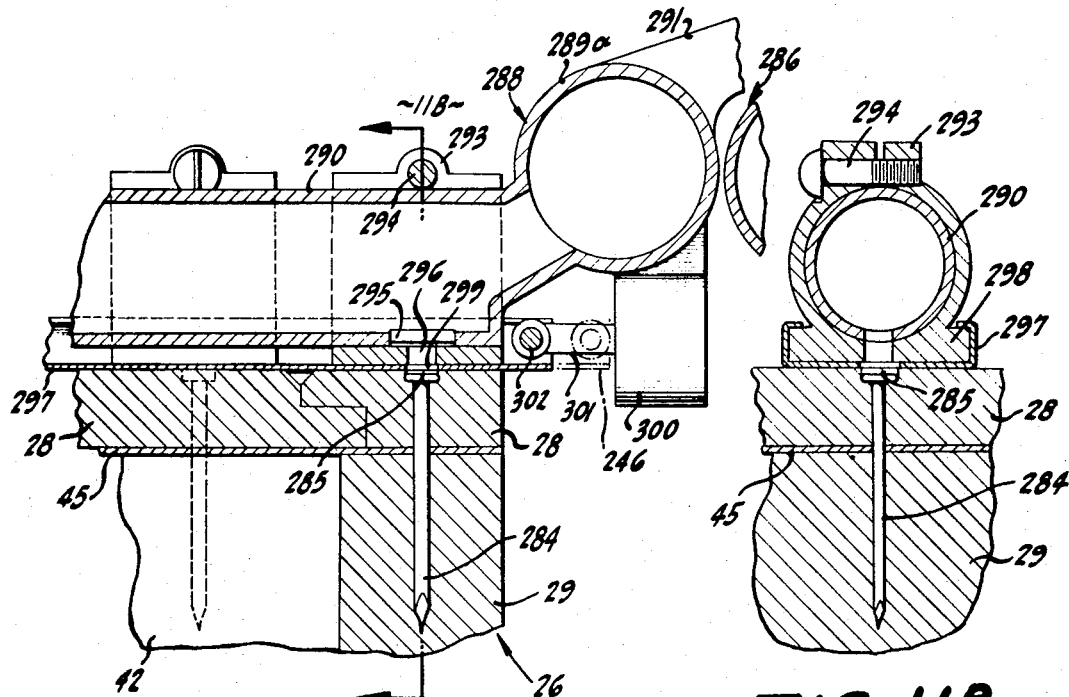

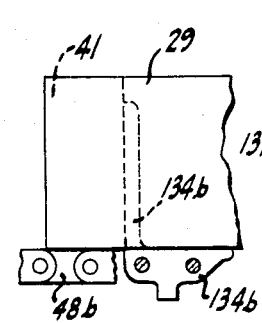
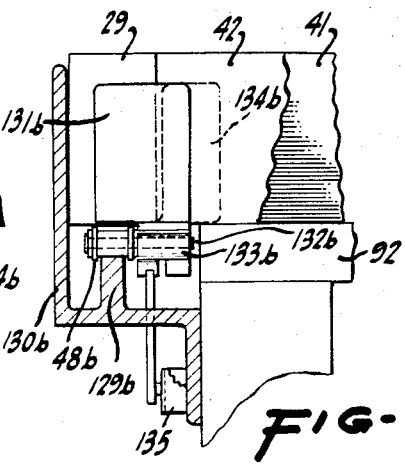
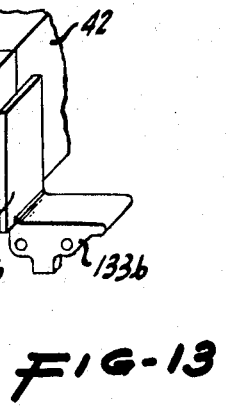
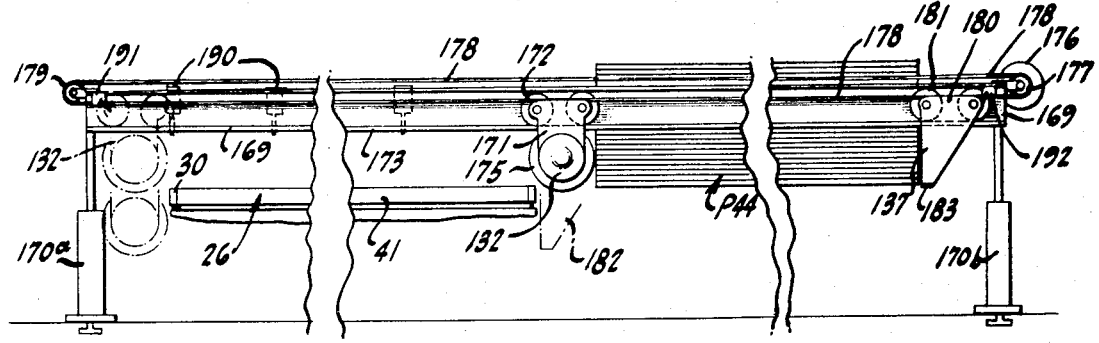
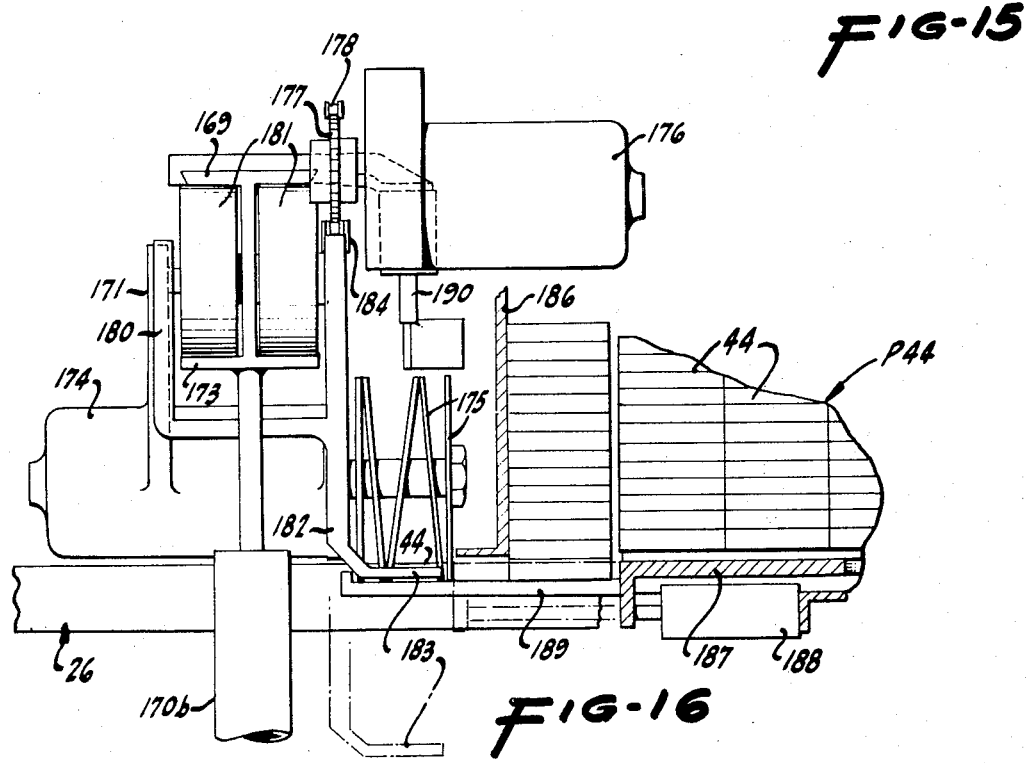

Nov. 3, 1970  E. W. CARROLL  3,537,168
FULL AUTOMATIC FRAMING MACHINE
Original Filed Oct. 20, 1965  8 Sheets-Sheet 8
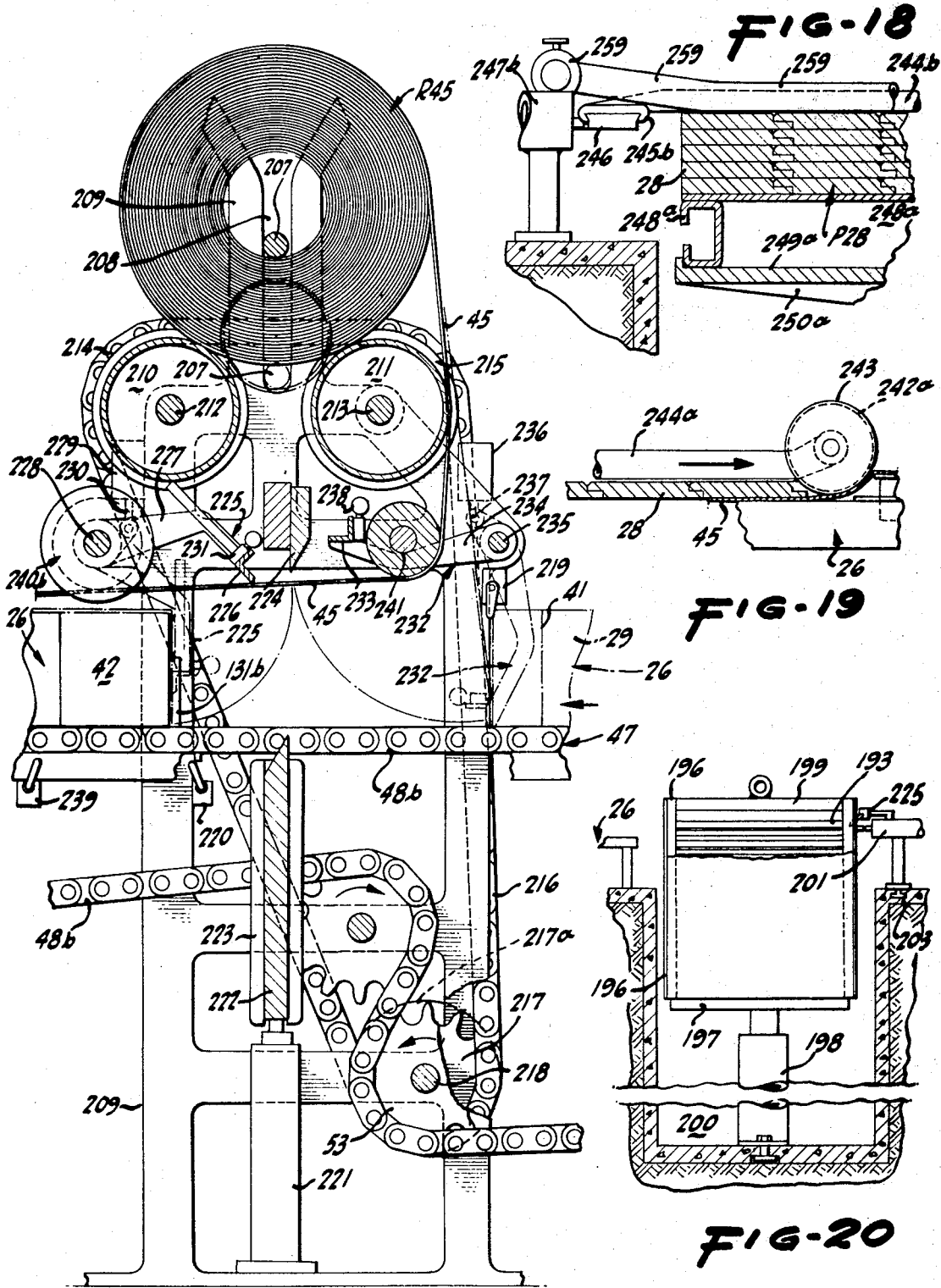

United States Patent Office 3,537,168
Patented Nov. 3, 1970

3,537,168
FULL AUTOMATIC FRAMING MACHINE
Ellsworth W. Carroll, Petaluma, Calif.; Hazel D. Carroll, executrix of the estate of said Ellsworth W. Carroll, deceased, assignor to John R. Carroll, Portland, Oreg.
Original application Oct. 20, 1965, Ser. No. 498,779, now Patent No. 3,399,445, dated Sept. 3, 1968. Divided and this application May 13, 1968, Ser. No. 739,604
Int. Cl. B23p 19/04; B23g 7/10, 7/00
U.S. Cl. 29—208                                            4 Claims

ABSTRACT OF THE DISCLOSURE

Apparatus for prefabricating building components on a wall frame having studs, is provided with mechanism to apply angularly related corner braces to the wall, saw mechanism to form recesses in the studs to receive corner braces, and a longitudinally movable carriage to displace a corner brace into the stud recesses.

RELATED APPLICATION

The present application is a division of pending application Ser. No. 498,779, filed Oct. 20, 1965.

This invention relates to an apparatus for prefabricating building components such as wall sections, roof trusses, and the like; and in greater particularity, the invention is concerned with a system for automatically segregating prepackaged structural elements and sub-assemblies one from another, for assembling and joining a group of such elements and assemblies in a predetermined pattern, and for otherwise treating or conditioning the assembled members to complete a building component prior to shipment thereof to a building site.

In a departure from traditional systems of construction in which buildings are erected element-by-element at the building site, modern construction techniques involve use at the building site of certain sub-assemblies typical of which is the door and door-jamb composition which is provided as a previously assembled unit ready for installation into the roughed in doorway of a building wall. For the most part, the sub-assemblies have been relatively small units such as doorway and window units, although to some extent, larger building assemblies have been prefabricated for subsequent use at the building site. Examples thereof are roof trusses which are intended to extend between outer walls of a building structure to relieve the inner walls thereof from load-bearing functions, and wall sections.

The present invention is a furtherance of such trend toward prefabrication of building components and constitutes an arrangement for automatically prefabricating (that is, fabrication or construction of building components for subsequent use at a building site, which fabrication usually occurs at locations quite remote therefrom) relatively large building components such as roof trusses, wall sections or panels, etc. An object, among others, of the invention, is in the provision of an automatic apparatus for segregating or separating a plurality of building elements, such as two-by-fours, from packages respectively providing the same in dimensionally accurate lengths, and for constructing a building component from such elements by assembling and joining the same in a predetermined pattern.

By way of example, and in the case of a wall section, the invention comprises an arrangement in which certain of the elements constitute studs or upright scantlings and others constitute longitudinally extending headers, bracing and fire stops; and such elements are segregated from the packages respectively providing the same and are assembled into a frame, along with one or more sub-assemblies (windows, for instance, in the case of a wall section), a vapor barrier is extended over such frame where this is desired, the frame is equipped with siding or other panel-forming elements, and any holes or other depressions are filled and at least portions of the resulting building component then may have a preservative applied thereto or be coated with a paint primer, etc.

Further characteristics of the invention, especially as concerns particular objects and advantages thereof, will become apparent from a consideration of the following specification and drawings, the latter of which illustrate a specific embodiment of the invention as follows:

FIG. 1 is a diagrammatic view depicting, in general, the various operating stations provided along apparatus made in accordance with the invention;

FIG. 2 is a diagrammatic perspective view corresponding essentially to the organization depicted in FIG. 1, and therefore illustrating the various operating stations along the apparatus;

FIG. 5 is a broken, longitudinal sectional view taken along the line 5—5 of FIG. 3A;

FIG. 6 is a broken, vertical sectional view taken along the line 6—6 of FIG. 5;

FIG. 7 is a broken, longitudinal sectional view taken along the line 7—7 of FIG. 3A;

FIG. 8 is an enlarged, broken, top plan view of the frame-making station illustrating the step of joining the fire stops and plates to the studs;

FIG. 9A is a broken, side view in elevation illustrating the frame-forming building elements in the position thereof for receiving fasteners;

FIG. 9B is a broken side view in elevation similar to that of FIG. 9A but illustrating the mechanism in the guide condition thereof;

FIG. 10 is a broken, transverse sectional view taken along the line 10—10 of FIG. 3A;

FIG. 11A is a broken, transverse sectional view taken along the line 11A—11A of FIG. 3A;

FIG. 11B is a broken, verticle sectional view taken along the line 11B—11B of FIG. 11A.

FIG. 12 is an enlarged, broken sectional view taken along the line 12—12 of FIG. 14, showing an attachment for the conveyor chain to engage and drive the inside corner studs and plates of a building wall section;

FIG. 13 is a broken, perspective view illustrating an attachment used for driving the outside corner studs and plates of such wall section;

FIG. 14 is a broken, transverse sectional view, partly in elevation, taken along the line 14—14 of FIG. 3A and showing the attachments of FIGS. 12 and 13 together with limit switches used in association therewith;

FIG. 15 is an angularly oriented sectional view taken along the line 15—15 of FIG. 3A;

FIG. 16 is an enlarged, broken end view in elevation of the mechanism shown in FIG. 15, the view being taken from the right side;

FIG. 17 is an enlarged, broken side view in elevation showing the delivery mechanism for the vapor barrier;

FIG. 18 is a broken, transverse sectional view taken along the line of 18—18 of FIG. 3B;

FIG. 19 is a broken, transverse sectional view taken along line of 19—19 of FIG. 3B;

FIG. 20 is a broken, vertical sectional view illustrating the rack in which the window sub-assemblies are transported and supported; and FIG. 21 is a broken, transverse sectional view taken along the line 21—21 of FIG. 3B.

GENERAL DESCRIPTION

Figure 3A:
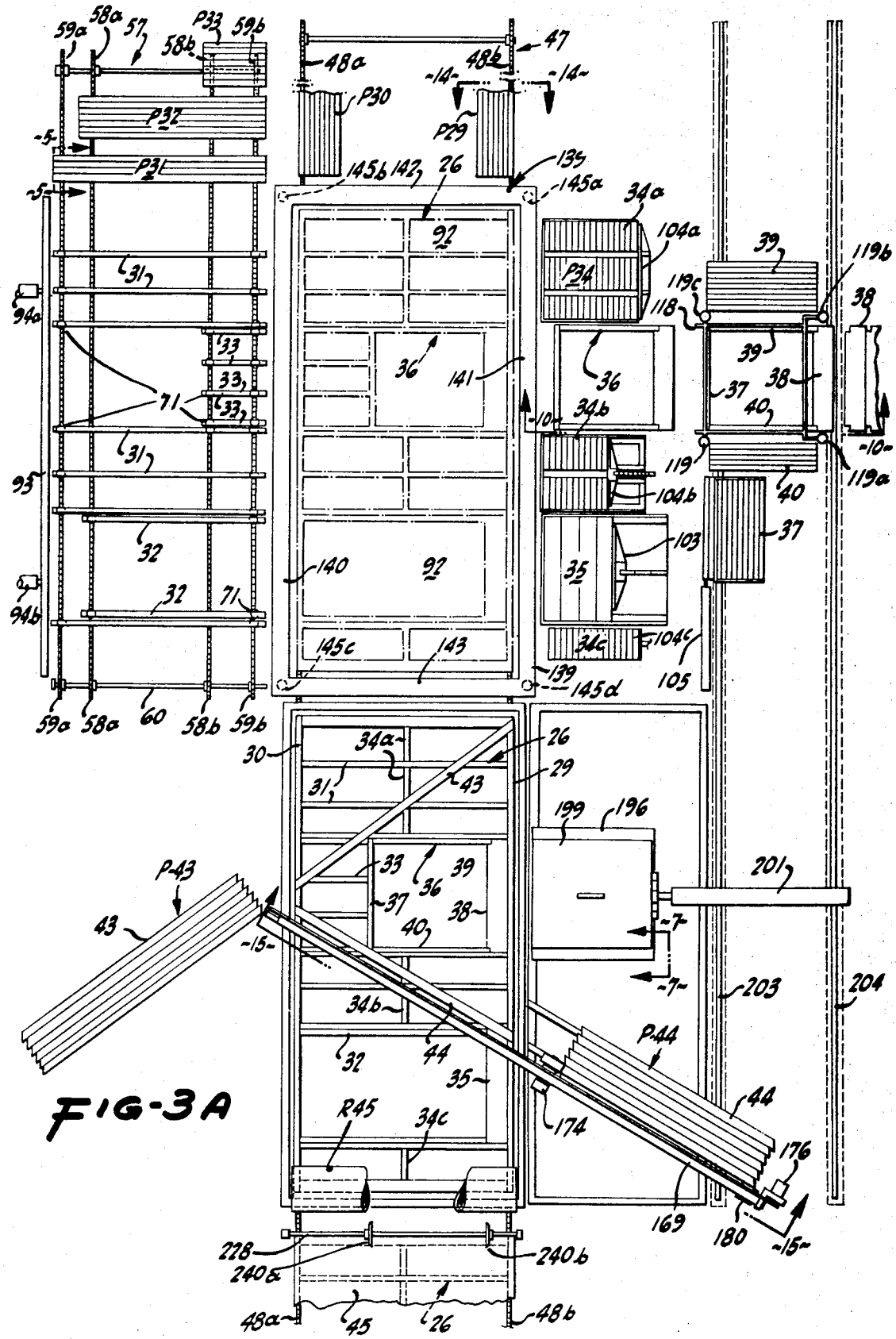
FIG. 3A is an enlarged, broken, top plan view of the segregating, frame-forming, and brace- and sub-assembly uniting stations.

As indicated hereinbefore, the present system for prefabricating building components is applicable to a variety of components as, for example, roof trusses and wall panels, each of which constitutes a plurality of structural elements oriented with respect to each other in a predetermined pattern and joined together to form a unitary component. The exemplary building component illustrated herein is a wall section comprising a frame equipped with at least one window and provided along one or both sides with closure panels.

Ususally, it is most advantageous to leave the inner side of the frame uncovered to facilitate installation of electrical and plumbing systems at the building site; and, depending upon the particular environment, the closure panels along the outer side of the frame may be finish siding (vertically or horzontally disposed), or sheet rock or some other backing material intended to be covered subsequently with a veneer such as stucco, or brick, which veneers are practicably positioned adong such backing material after erection of the building component at the building site.

Such wall section is illustrated in FIG. 2 in the various stages of assembly thereof, and the completed wall section is denoted with the numeral 25 and comprises a frame 26 having positioned therealong a sub-assembly in the form of a window 27. The frame 26 is covered along one side thereof with horizontally disposed strips of siding 28. The frame 26 is seen to comprise a plurality of studs or upright scantlings of predominantly one length which extend between horizontally disposed top and bottom plates 29 and 30. Such studs are disposed intermediate the corners or ends of the frame, and in view of the dimensional similarity of such studs, each is denoted with the numeral 31. Also disposed interiorly of the frame corners or ends are a plurality of shorter door studs 32 (sometimes referred to as door cripples) and a plurality of even shorter window studs 33 (sometimes referred to as window cripples).

Disposed intermediate at least certain of he successively adjacent studs are a plurality of fire stops which are horizontally disposed and are substantially parallel to the top and bottom plates 29 and 30. The fire stops, for assembly purposes as will be described hereinafter, are arranged in several separate groups; and to facilitate subsequent description, the fire stops respectively constituting the three groups thereof shown in FIG. 2 are denoted 34a, 34b and 34c. The frame further includes a door header 35, and a window sub-assembly 36 comprising a sill 37, window header 38 and side frames 39 and 40. The frame 26 also has as a part thereof end studs 41 and 42 and diagonal or corner braces 43 and 44.

The structural elements constituting the frame 26 are fixedly secured one to another by appropriate fasteners such as conventional nails and, as heretofore explained, the wall section 25 further includes the window 27 which seats within the window frame 36, and the siding 28 which covers one side of the frame. In many instances, a vapor barrier will be included as a part of the wall section and is located beneath the siding 28. In FIG. 2 the vapor barrier extends across the window 27 in overlying relation therewith and is denoted with the numeral 45.

All of the structural elements may be conventional, and in the specific assembly system illustrated and described, the frame plates 29 and 30, studs 31, 32 and 33, fire stops 34, headers 35 and 38, window elements 37, 39 and 40, corner studs 41 and 42, and corner braces 43 and 44 may be the usual wooden one-by-fours. Similarly, the exterior siding 28 may be wood lumber or pressed wood, and the vapor barrier 45 may be plastic film such as polyethylene or an impregnated building paper.

The wall section 25 is fabricated from the various structural elements and sub-assemblies comprising the same at a plurality of stations which are indicated diagrammatically in FIG. 1 as Stations #1 through #5. It will be evident by comparing FIGS. 1 and 2, that the assembly sequence perspectively depicted in FIGURE 2 is correlated generally with the operating stations respectively located thereabove in FIG. 1. At Station #1, certain of the structural elements comprised by a frame 26 are respectively disposed in groups each of which constitutes a convenient number of elements which together define a package in which such elements are shipped from the supplier (i.e., a lumber mill in the event of the usual two-by-fours).

More specifically, the studs 31 which are all sized and accurately dimensioned by the supplier, are shipped in a package or group generally designated in FIG. 2 with the numeral P31; and, similarly, the door cripples constitute a group designated P32, the window cripples constitute a group P33, and the corner studs 41 and 42 are respectively arranged in groups of P41 and P42. In a completely analogous manner, the plates 29 and 30 are arranged in groups thereof denoted P29 and P30. The location of all such groups essentially defines Station #1 which may be taken to be the loading and segregating station, although such station should not be considered to be restricted by the arbitrary limits in FIG. 1 because other groups or packages of structural elements and sub-assemblies are not within the confines of such limits.

In this respect, the various structural elements constituting the fire stops 34, the door and window headers 35 and 38, and the window frame elements 37, 39 and 40 are also arranged in packages or groups from which the elements are adapted to be segregated as each frame is formed. The location of such packages may be taken to constitute a part of loading and segregating Station #1, although such packages are physically remote or displaced from the aforementioned packages. For purposes of positive identification, the three groups of fire stops 34 are denoted P34a, P34b and P34c, the door and window headers are designated P35 and P38, the group of window sills is P37, and the groups of window frames are identified as P39 and P40.

The various structural elements are segregated from the respective packages or groups thereof and are displaced in a particular order into a predetermined orientation defining the frame 26. Such displacement of the structural elements occurs in part at an assembly station denoted in FIG. 1 as Station #2 and in part at an assembly station denoted Station #3. At Station #2, the elements displaced thereinto are joined by suitable fasteners such as nails; and the partially formed frame is then advanced into Station #3 whereat a window 27 is placed within the window frame 36 and the corner braces 43 and 44 are displaced onto the frame and are secured thereto. It will be noted that the windows and corner braces are arranged in packages or groups thereof adjacent Station #3, and for identification, the group or package of windows is designated P27 and the packages of corner braces 43 and 44 are respectively denoted P43 and P44. The windows are supplied with the sashes thereof glazed.

After a window 27 and corner braces 43 and 44 have been properly incorporated in the frame 26, the frame is advanced into Station #4 whereat the strips of exterior siding 28 are secured in position along one side of the frame and, in the usual instance, the siding will be nailed to the frame. At this same station, the nail holes are filled with a suitable filler such as a quick drying caulking compound.

Thereafter, the wall section is essentially complete and is displaced into Station #5 at which a suitable coating can be applied to the siding. Depending upon the particular use intended for the building section, the coating may be a fiber-penetrating preservative or a finish covering. The siding 28, it will be noted, is also supplied in packages one of which is illustrated in FIG. 2 and is denoted P28. As indicated hereinbefore, the frame 26 may be equipped with a vapor barrier prior to placement of the siding 28 thereon, and the vapor barrier may be drawn from a roll across the frame as it is displaced into Station #4. A roll of vapor barrier is shown in FIG. 2 and is designated with the numeral R45.

After each of the wall sections 25 have been coated, in those instances where a coating is required, thin spacers or shims are disposed in spaced apart relation therealong and serve to separate one building section from another stacked thereon preparatory for storage and shipment. The spacers may be grouped or packaged, as indicated in FIG. 2 with the numeral P46, and individual spacers are displaced from the package as required. A substantial number of wall sections all of the same size and type may be fabricated by the apparatus although the particular apparatus being considered herein is selectively adjustable so that wall sections of different size and type may be assembled. Quite evidently, when wall sections are shipped to a building site for assembly thereat, the shipment will include all of the sections required for a complete building and in the usual case, one or more wall sections will differ from the others.

DETAIL DESCRIPTION

In the particular system for prefabricating building components, the various structural elements and sub-assemblies are displaced from the respective loading positions thereof and onto a conveyor mechanism that carries the elements through the various stations of the system as the building component is progressively fabricated. In the specific apparatus illustrated, the path of movement of the main conveyor mechanism is unidirectional or linear, although this is by no means essential, and such conveyor mechanism is denoted generally with the numeral 47.

The conveyor 47 includes a pair of endless chains 48a and 48b respectively entrained about idler and drive sprockets. Certain of such sprockets are indicated diagrammatically in FIG. 1 and for purposes of identification, the drive sprocket for the chain 48a is denoted with the numeral 49 and is disposed adjacent Station #5. Power is transmitted to the drive sprocket 49 from a prime mover 50 which, in the usual instance, will be an electric motor. It will be understood that the sprocket 49 is keyed or otherwise secured to a shaft 51, adjacent one end thereof, so as to prevent relative movement therebetween, and the shaft 51 adjacent its other end will be equipped with a similar drive sprocket (not shown) about which the conveyor chain 48b is entrained. A plurality of additional sprockets operatively arranged with the chain 48a are shown in FIG. 1, and such additional sprockets are respectively identified as the elements 52, 53, 54, 55 and 56.

The conveyor 47 is actuated intermittently and, as indicated hereinbefore, progressively advances the structural elements through the various assembly stations. Accordingly, various controls, primarily in the nature of limit switches, are provided in the apparatus to automate insofar as practicable the operational sequence thereof.

Referring to FIG. 3a in particular, it is seen that the groups of plates P29 and P30 are respectively disposed along the conveyor chains 48 general inwardly thereof. The groups of studs P31, P32 and P33, however, are offset laterally from the conveyor 47 and are associated with a stud conveyor 57. Such conveyor includes two sets of conveyor chains, namely, an inner set comprising endless chains 58a and 58b and an outer set comprising endless chains 59a and 59b. As shown in FIG. 3a, the chains comprising the stud conveyor 57 are entrained about a plurality of respectively associated sprockets at least certain of which are driven. In this respect, the sprocket 54 of the main conveyor 47 is provided with a shaft 60 that is elongated and extends through the stud conveyor 57 and constitutes the drive shaft thereof. Suitable sprockets are keyed to such shaft 60 and drivingly engage the chains 58 and 59 entrained thereabout.

The order of displacement and advancement of the studs as they are segregated from the respective groups thereof is such that the orientation following advancement is as illustrated in FIG. 3a so that when the studs are displaced transversely into the assembly Station #2, the intermediate studs 31, door studs 32 and window studs 33 are properly located for interconnection thereof with the plates 29 and 30, fire stops, etc. to form the complete frame 26.

Evidently, all of the chains 58 and 59 of the stud conveyor 57 are actuated concurrently and are driven in timed relation with the chains 48 of the main conveyor 47 because of the interconnection defined between the two conveyors by the shaft 60. The spacing between the various chains 58 and 59 is such that the longer studs 31 are supported by the two outermost chains 59a and 59b, the door studs 32 are supported by the chains 58a and 59b, and the window studs 33 are supported by the chains 58b and 59b.

All of the groups or packages or structural elements and sub-assemblies are located above the respectively associated conveyors and other displacement components, and the individual structural elements are segregated from their associated packages as needed and are positioned upon the associated conveyors for movement into the appropriate assembly station. The support means for the various packages may be substantially the same both in terms of structure and function, and an exemplary instance thereof is illustrated in FIGS. 5 and 6.

Referring thereto, it is seen that the package P31 constitutes a plurality of individual studs 31 arranged in side-by-side and vertically stacked juxtaposition within a magazine generally denoted 61. The lowermost studs in such package are supported upon a platform 62 formed by the horizontal flanges 63a and 63b of a pair of transversely spaced L-shaped channel members 64a and 64b. The vertical flanges of the channel members define the marginal edges of the platform 62 and serve to confine the studs 31 against movement in transverse directions relative to the platform. Disposed below the platform 62 is a reciprocable gate 65 having the general configuration of an L-shaped channel. The gate 65 extends substantially from one channel member 64 to the other, and the horizontal flange 66 of the gate is slidably disposed beneath the undersurface of the platform 62 and is supported upon glides 67a and 67b fixedly carried by the frame structure of the apparatus.

The gate 65 is longitudinally displaceable between an open, stud-releasing position (shown in full lines in FIG. 5) forwardly of the platform 62 and a closed, stud-confining position in which it is displaced toward the right, as viewed in FIG. 5, and into the position illustrated therein by broken lines. Displaceable with the gate 65 is a guide element 68 which is secured thereto in spaced relation with the depending leg thereof, and the spacing between the guide element and depending leg of the gate is sufficient to accommodate a stud 31. Positioned beneath the gate 65 and guide element 68 in alignment with the space or opening therebetween when the gate is in its open position is a support defined by support channels 69a and 69b adapted to receive a stud 31 thereon, as shown in FIG. 5. Thus, when the gate 65 is in the open position thereof, as illustrated, a stud 31 may move downwardly from the package P31 thereof and onto the support 69. Subsequent displacement of the gate 65 and guide 68 toward the right will move the stud 31 from the support 69 thereby permitting it to fall downwardly and onto the stud conveyor 57, as will be described subsequently.

Reciprocable displacements between the open and closed positions thereof are enforced on the gate 65 by motor means 70a and 70b each of which is in the form of piston-cylinder structure. Each motor means 70 may be a conventional fluid-actuated mechanism, either liquid or gas, and the cylinder member thereof illustrated is constrained against movement by any suitable mounting structure. The piston of each motor means is connected to the gate 65 so as to enforce movement thereon; and the two motor means are spaced apart transversely and are respectively located adjacent the channel members 64a and 64b. Such spacing between the motor means 70a and 70b imparts a relatively symmetrical displacing force to the gate 65 which, in the case of the studs 31, usually will have a distance of about eight feet between the ends thereof.

Evidently, as the gate 65 is displaced toward the right, as seen in FIG. 5, the depending flange thereof will engage any stud 31 positioned upon the support 69 and will move such stud from the support, thereby permitting the stud to descend by virtue of its own weight toward the conveyor chains 59a and 59b. The conveyor chains are each equipped with a generally U-shaped attachment link or carrier adapted to receive such descending stud between the spaced apart legs thereof. For purposes of identification, the U-shaped carriers respectively provided by the chains 59a and 59b are denoted with the numerals 71a and 71b. Such carriers are removably secured to the chains associated therewith as by means of sliding the carriers over attachment pins 72 carried by the chains and which extend laterally therefrom. The chains 59a and 59b are resepectively supported on underlying rails 73a and 73b to enable the chains to carry the weight of the studs without sagging. The entire chain, carrier and rail combinations are, in turn, respectively associated with support channels 74a and 74b which are welded or otherwise fixedly secured to the cross members of a frame structure generally denoted 75.

Longitudinally reciprocable along the aforementioned L-shaped channel members 64a and 64b, which members are located above the support channels 69a and 69b, is a carriage 76 comprising a pair of upwardly extending side plates 77a and 77b, a horizontally oriented transverse web 78, and a vertically oriented transverse pusher 79. The side plates 77a and 77b are respectively equipped with support rollers 80a and 80b that engage the upper edges of the channel members 64a and 64b and thereby support the carriage for reciprocable movement therealong. As shown in FIG. 5, the plate 77a is equipped with a plurality of longitudinally spaced rollers 80a and the plate 77b is similarly equipped with a plurality of rollers. The plates 77a and 77b may each be provided with one or more additional rollers oriented in underlying engagement with the channels 74a and 74b, and for purposes of identification, such additional rollers are denoted 81a and 81b.

Supported for pivotal movement about the axis of one of the rollers 81a is a pawl 82a adapted to selectively engage a plurality of upwardly protruding teeth provided by a rack 83a which is fixedly secured to drive bar 84 that is connected to the movable element of a motor means 85 in the form of of piston-cylinder structure. In a completely analogous manner, a pawl 82b is carried by the side plate 77b and is adapted to selectively engage the teeth of a rack 83b secured to the drive bar 84. As in the case of the motor means 70a and 70b, the motor means 85 may be conventional and can be either a liquid or gas operated piston-cylinder mechanism. The pawls are biased toward engagement with the teeth of the associated racks by their own weight which can be spring supplemented where desired.

Forwardly of the carriage 76 is a stationary guide wall 86 oriented in vertical alignment with the aforementioned guide element 68 whenever the gate 65 is in the open position thereof. Thus, the guide wall 86 and the forward terminal end of the platform 62 are spaced apart and define therebetween an opening sufficiently large to pass a stud 31 therethrough. The carriage 76 is movable toward and away from the guide element 86, and in being advanced theretoward, is periodically indexed forwardly in a step-by-step manner to advance a vertically stacked row or column of studs 31 into alignment with the opening formed between the platform 62 and guide element 86.

The guide element 86 has an opening 87 formed therealong, and adapted to pass therethrough is the roller-equipped actuator arm of a conventional limit switch 88. The limit switch 88 is arranged with the motor means 85, as by means of a solenoid controlled valve (not shown), so as to energize the same to index the carriage 76 forwardly one step whenever the space along the inner surface of the guide element 86 is devoid of a column of studs. In the position of the components shown in FIG. 5, a stud is in engagement with the actuator arm of the limit switch and holds such arm outwardly, whereupon the motor means 85 is de-energized.

However, when the last stud in the vertical column thereof adjacent the element 86 has moved downwardly and onto the support 69, the arm of the limit switch will move inwardly through the opening 87, and such movement will result in energization of the motor means 85 to cause the carriage 76 to advance another column of studs into adjacency with the guide element 86. When an entire package P31 has been used and the carriage 76 is then in its most forward position, it can be manually or otherwise returned to the starting position thereof so that another package of studs can be loaded into the magazine 61.

Displacement of each stud from the support 69 is accomplished in a somewhat corresponding manner; and in this respect, each of the U-shaped carriers 71 is provided with a depending lug 89, and a limit switch 90 provided along the chain 59a has a roller-equipped actuator arm passing through an opening 91 in the channel 74a so that it can be engaged by such lug 89 of a carrier mounted on the chain 59a. The limit switch 90 is adapted to control the motor means 70, as through a solenoid valve (not shown), and energize the reciprocatory cycle of each of the motor means 70a and 70b whenever a lug 89 trips the switch 90. Accordingly, and as shown in FIG. 5 as a carrier 71a is advanced by the chain 59a, it trips the switch 90, whereupon the motor means 70 are energized to displace a stud 31 forwardly from the support 69 to permit such stud to fall downwardly and into the aligned carriers 71 which, at such instant, have been advanced into a position for receipt of the stud. The motor means 70 then return the gate 65 to the open position thereof to permit another stud to move downwardly and onto the support 69.

As indicated hereinbefore, the magazine 61 and segregating mechanism associated therewith, which have been described in detail, typify the magazine and segregating mechanism used in the instance of each of the packages of structural elements. Accordingly, the one detailed description and specific illustration suffices for all of the packages. Also, the various endless chains 58 and 59 comprised by the stud conveyor 57 will be equipped at appropriate intervals therealong with U-shaped carriers 71 and, as explained heretofore, the chain 59b will have a carrier for each timber or element advanced by the stud conveyor and the chains 58a, 58b and 59a will have only a sufficient number of carriers to accommodate the studs advanced thereby. It will be evident that the carriers are arranged in aligned pairs and are operative to positively advance the structural elements associated therewith while confining the same to a rather precise and predetermined location.

Such feature of positive advancement and accurate location is especially advantageous in that the various elements are displaced transversely from the stud conveyor 57 and onto an assembly pad or table 92 supported upon the chains 48a and 48b of the main conveyor 47. Such displacement of the various studs 31, 32 and 33 from the conveyor 57 and onto the table 92 is effected by an elongated push bar 93 that extends generally along the chain 59a of the stud conveyor and is supported for transverse displacement thereacross.

Reciprocable displacement of the push bar 93 is accomplished by a pair of motor means 94a and 94b which may each comprise a piston-cylinder structure, as heretofore described. The stroke of the motor means 94 is quite long in that the motor means must be operative to displace the push bar 93 from the starting position thereof on one side of the stud conveyor, as illustrated in FIG. 3a, into an extended position on the opposite side of the stud conveyor so as to advance each of the segregated studs 31, 32 and 33 onto the table 92. Any suitable guide structure for the push bar may be employed, and it is clear that the path of movement of the push bar must be above the upper extremities of the carriers 71.

Also displaced onto the table 92 to form a part of the frame 26 of the wall section are the fire stops 34a, 34b and 34c. In the particular arrangement illustrated, there are three groups of fire stops 34a, two groups of fire stops 35b and one group of fire stops 34c, and such elements are respectively aligned with the spaces defined between certain of the adjacent studs displaced onto the table 92 from the stud conveyor 57. The fire stops are segregated from the packages respectively comprising the same in the same general manner heretofore explained with reference to the studs 31, and following segregation the fire stops are displaced from the transverse or lateral position thereof illustrated in FIG. 3A toward the left and into the position upon the table 92 illustrated by broken lines in such figure.

More particularly, and with reference to FIGS. 8 and 9A which illustrate the fire stops 34a, the three groups of fire stops 34a are respectively disposed within their own magazines which, as explained, are essentially the same as the magazines 61 and segregating mechanism associated therewith. For purposes of identification, the three magazines illustrated in FIG. 8 are denoted with the numerals 95a, 95b and 95c. All of the fire stops have been removed from such magazines, except for the forward column, and the carriage apparatus for advancing the fire stops step-by-step has been omitted for purposes of clarity.

In FIG. 9A, a fire stop 34a is seen to be positioned upon a support 96 which is essentially the same as the support 69 heretofore described. In engagement with such fire stop is the gate 97 which is secured to the piston rod 98 of a piston-cylinder structure defining a motor means 99. The motor means 99 may be essentially the same as the motor means 70 heretofore described and its function is to displace an associated fire stop into the frame-forming position illustrated by broken lines in each of FIGS. 8 and 9A. There is a motor means 99 associated with each of magazines 95 and for purposes of differentiation, the same numeral with a letter suffix added thereto is employed in each instance.

Also associated with each of the magazines 95 and extending along the motor means 99 thereof is a telescoping conduit 100 (the suffixes a, b and c being employed therewith to associate the same appropriately with the various magazines 95). The conduits 100 are adapted to be connected to a source of reduced pressure (i.e., a subatmospheric pressure), and each conduit is effective to elongate telescopically as the associated gate is disposed by the motor means 99 therefor. The function of each conduit 100 is to apply a reduced pressure to the fire stop 75 engaged by the associated gate so as to clamp the fire stop thereto. In accomplishing this vacuum-clamping function, each conduit 100 is connected to a flexible pad 101 (suffixes again being used where appropriate) secured to and carried along the face of the gate 97 so as to engage a fire stop positioned upon the support 96.

Evidently, the reduced pressure applied to the fire stop through the clamping pad 101 is operative to secure the fire stop to the gate which enables the gate to displace the fire stop into the appropriate position therefor on the table 92.

Suction to clamp each fire stop to the associated gate 97 may be interrupted through a suitable solenoid control valve (not shown) which is energized by engagement of each fire stop with an associated limit switch 102 located adjacent the nailing position of the fire stop, as shown in FIGS. 8 and 9A. The reciprocatory cycle of each of the motor means 99 may be initiated in any suitable manner as, for example, by having the same energized concurrently with the associated gate 97.

It is evident from FIGS. 8 and 9A that a rigid frame mechanism is disposed above the table 92 and must be elevated thereabove to permit the fire stops 34a to be displaced onto the table. This frame structure comprises a plurality of automatic nailing or fastening mechanisms and will be described in detail. However, it might be appropriate to note first that a door header 35 is segregated from a package thereof and is displaced transversely onto the table 92 by a magazine and segregating mechanism which may be of the type previously described. The carriage of such segregating mechanism is partially illustrated in FIG. 3A, and for purposes of identification, the carriage is denoted with the numeral 103. Also in this figure, the carriage mechanisms for the fire stops 34a, 34b and 34c are partially illustrated and for purposes of identification, such carriages are respectively denoted 104a, 104b and 104c.

Also prior to describing the aforementioned fastener mechanisms, it may be noted that a window frame sub-assembly 36 is displaced as an integer onto the table 92 and into the position shown by broken lines in FIG. 3A. However, before such displacement of the window frame sub-assembly, it must be fabricated from a sill 37, header 38 and side frames 39 and 40. Referring to FIGS. 3A and 10 in particular, it may be noted that the side frames 39 and 40 are respectively contained in packages therefor which are disposed in spaced apart, parallel relation. In the fabrication of a window sub-assembly, a side frame is segregated from each of the packages thereof and is displaced inwardly into the frame-forming position shown in FIG. 3A. Similarly, a sill 37 is separated from the package comprising the same and the segregated sill is displaced inwardly and into the frame-forming position shown by a motor means 105 in the form of an elongated piston-cylinder structure. Also, a window header 38 is segregated from the package containing the same and is advanced into contiguous relation with the side frames 39 and 40. All of the window frame sub-assembly components 37 through 40 are then in proper position and may be connected to each other by suitable fastener structures.

Segregation of the side frames 39 and 40 and window header 38 from the package thereof may be accomplished by apparatus such as that shown in FIG. 5. Also, segregation of each sill 37 from the package thereof may be effected with mechanism such as shown in FIG. 5 except that the motor means 105 is employed in association therewith to enforce longitudinal displacement upon each segregated window sill to advance the same into the frame-forming position. The sill, header and side frames are joined by fasteners which may be conventional nails, and such interconnection of the window frame elements 37 through 40 is accomplished automatically by the apparatus illustrated in FIG. 10.

Such apparatus includes a support base, generally denoted as 106, having a plurality of legs 107 interconnected by a plurality of horizontal components—one of which is illustrated and is denoted 108. The members 108 define a pedestal or support for the various elements of the window frame sub-assembly 36. Secured to such frame 106 is a motor means 109 in the form of a piston-cylinder structure. The piston thereof is equipped with a rod pivotally connected by a pin 110 to a driving arm 111 that is pivotally connected to one end of a lever 112. The lever 112 is pivotally supported intermediate the ends thereof on a leg 107 by a pivot pin 113, and at its opposite end the lever 112 is pivotally connected to the rod 114 of a motor means 115 in the form of piston-cylinder structure. The cylinder of the motor means 115 is secured to the support base 106 whereupon actuation of the motor means causes reciprocable displacement of the piston thereof and of the rod 114 secured thereto.

The driving arm 111 has a hardened tip or nose 116 that is adapted to engage nails and strip the same from a magazine 117 containing a supply thereof. The nail magazine 117 is mounted upon a support frame 118 of generally rectangular configuration which is operatively connected adjacent each corner thereof to an elevating piston-cylinder structure 119. There will be four such elevating piston-cylinder structures one for each corner of the frame 118—and they will be energized concurrently so that the frame 118 is uniformly elevated and thereafter returned to its initial position.

The purpose of raising and lowering the support frame 118 is to permit a plurality of nails to be driven into the window frame sub-assembly at different locations so that such assembly is secured at each location by more than one nail. Accordingly, the support frame 118 will be displaced upwardly step-by-step with each step defining the location of a nail. Correspondingly, each of the nail-driving arms 111 must be concurrently displaced upwardly in a step-by-step manner with the support frame 118 so that the nail-driving nose 116 remains aligned with the lowermost nail in the associated magazine 66 to strip the nail therefrom and drive it into the associated timbers. In the specific structure shown, there are three such positions and they are identified in FIG. 10 with respect to the lever 112 by the location denoted $a$, $b$ and $c$. Evidently, upward displacement of the piston rod 114 from the position $b$ shown to position $a$ will cause the driving arm 111 to be displaced downwardly. In order to accommodate vertical movement of the driving arm 111, the cylinder 109 may be pivotally affixed to the support frame 106 in a manner permitting the cylinder to be angularly displaced slightly as the arm 111 is either raised or lowered. By way of example, the positions $a$, $b$ and $c$ may be arranged so that they space nails from each other by a distance of about 1½ inches.

Four nailing assemblies, one for each corner of the window frame sub-assembly 36, are provided and two of such assemblies are shown in FIG. 10. The two illustrated assemblies are oriented at right angles with respect to each other and are located adjacent two of the corner portions of the sub-assembly. The two additional nailing assemblies which are not shown will be similarly oriented with respect to each other. For purposes of identification and differentiation, the two nailing assemblies illustrated in FIG. 10 have the components thereof designated with the same numerals except that the suffix $a$ has been added, where appropriate, to the numerals associated with one of the assemblies. Similarly, the two elevating cylinders shown in FIG. 10 are differentiated in that one is identified with the numeral 119 and the other with the numeral 119$a$.

Secured to the support frame 106 beneath the horizontal members 108 thereof is an elongated cylinder 120 equipped with a piston having a similarly elongated rod 121 secured thereto at one of its ends. At its other end, the rod 121 turns upwardly and is connected with a transversely oriented, reciprocable slide block 122. The slide block 122 is reciprocable along the horizontal disposed frame element 108, and extending forwardly from the slide block and secured thereto is a push rod 123. Adjacent its opposite end, the push rod is secured to a slide block 124 which corresponds essentially to the slide 122 and is similarly reciprocable with respect to the frame elements 108. Such frame elements are equipped with a guide channel 125 in which the blocks are slidable.

The slide blocks 122 and 124 are respectively provided with pawls 127 and 128, and such pawls are spring biased upwardly and into the position illustrated in FIG. 10 in which the forward ends thereof are located above the horizontal frame members 108 and are adapted to abut the headers 37 of respective window frame subassemblies 36. The pawls are movable downwardly against the biasing force of such springs so as to permit the slide blocks to be displaced through their return stroke (toward the right as viewed in FIG. 10) with sub-assemblies 36 being supported along the horizontal members 108.

As is evident from inspection of FIGS. 3A and 10, the pawls 127 and 128 are adapted to respectively engage a window-sub-assembly located in the forming position thereof (the right-hand side in FIG. 3A) and a previously formed sub-assembly which has been advanced from such forming position and into the intermediate position illustrated in FIG. 3A whereat it is disposed between the groups of fire stops 34$a$ and 34$b$. Upon energization of the cylinder 120, the rod 121 is displaced toward the left, as seen in FIG. 10, the sub-assembly 36 engaged by the pawl 128 is displaced thereby onto the table 92 and, at the same time, the frame assembly engaged by the pawl 127 is displaced into the intermediate position previously occupied by the sub-assembly which has been advanced onto the table 92. When the cylinder 120 is energized through its return stroke, the pawl 128 is displaced downwardly as a conseqence of its engagement with the assembly 36 then occupying the intermediate position. The apparatus is in condition for a subsequent cycle of operation following such return stroke.

Before the fastening mechanisms are made operative to interconnect the various structural elements defining the frame 26, it is necessary to have the plates 29 and 30 and the corner studs 41 and 42 in the assembly position defined by the table 92. In the particular apparatus being considered, the plates and corner studs are appropriately located in the assembly station prior to the time that the intermediate studs 31, 32 and 33, the fire stops 34 and a window frame sub-assembly 36 are all displaced transversely into the assembly station. Considering such movement of the corner studs and plates into the assembly station, they are first segregated from the packages thereof in the same manner and by essentially the same mechanism as that described with particular reference to the studs 31. Such segregation of the corner studs and plates will dispose the same along the main conveyor 47, and the conveyor is operative to advance the same onto assembly Station #2, as shown by broken lines in FIG. 3A.

FIGS. 12 through 14 illustrate carriers or flights used with the chains 48$a$ and 48$b$ of the main conveyor 47 to advance the corner studs and plates into the assembly station. Referring to these figures, it will be noted that the chains 48$a$ and 48$b$ are located along the longitudinal edges of the table or platform 94, and that the chains in advance of the platform may be supported by rails, 129$b$ in the case of the chain 48$b$, to prevent sagging under the weight of the corner studs and plates. The rail 129$b$ may be provided by guide structure 130$b$ having an upwardly extending wall serving as a guide for the adjacent plate 29. A similar arrangement is provided along the conveyor chain 48$a$.

As shown in FIG. 14, the chain 48$b$ is equipped with a first outer carrier or flight 131$b$ removably secured to the chain in any suitable manner as, for example, by means of a plurality of pins 132$b$ which slide into openings provided therefor in a depending leg 133$b$ of the carrier. The carrier, as shown in FIG. 13, extends upwardly from the chain and is adapted to abut the terminal end of an adjacent plate 29 aligned therewith. The carrier is sufficiently wide (see FIG. 14) to extend inwardly beyond the edge of the plate 29 so as to engage the corner stud 42 in juxtaposition therewith. Accordingly, the carrier 131b (and its counterpart on the chain 48a) is adapted to engage a plate and corner stud and advance the same toward assembly Station #2.

Also removably mounted upon the chain 48b, is a second inner carrier or flight 134b which is disposed entirely interiorly of the adjacent plate 29, as shown in FIGS. 12 and 14, and extends upwardly from the chain so as to engage an inner corner stud 41. Accordingly, each flight 134 is adapted to engage such corner stud 41 and advance the same toward the assembly station.

Forward movement of the main conveyor 47 may be terminated, when the plates 29 and 30 and corner studs 41 and 42 are accurately located in the assembly station, by means of a limit switch 135 mounted upon the guide structure 130b and having an actuator arm extending upwardly through an opening in the guide structure. The arm is adapted to be tripped by the depending leg of the carrier 131b to change the condition of the switch.

Evidently, the plates 29 and 30 are advanced into the assembly station prior to displacement thereinto of the interior studs, fire stops, window frame sub-assembly, and door header, and this necessitates movement of the plates into a position which will not restrict such displacement of the enumerated members. In the specific apparatus being considered, the plates 29 and 30 are lowered to a location somewhat below the upper surface of the table 92 so that the interior studs, fire stops, etc., can move over the plates in being displaced onto the table.

An exemplary means for so lowering the plates is shown in FIG. 9A and includes a pair of piston-cylinder structures 136a and 136b respectively mounted upon purchase plates provided therefor by certain of the legs 107 of the support base 106, which structures 136 are respectively associated with the conveyor chains 148a and 148b. The structures 136 are respectively provided with piston rods 137a and 137b which carry, respectively, track sections 138a and 138b that slidably receive the chains 48a and 48b thereon. The plates 29 and 30 are carried by such chains and are located above the vertically displaceable track sections 138 whenever the plates are in the assembly station.

Accordingly, if the motor means defined by the piston-cylinder structures 136 are energized so as to lower the tracks 138, the underlying chains 48 will be lowered and so will the plates supported thereon. (See FIG. 9B). The stroke of the motor means 136 is sufficient to displace the plates downwardly to a location substantially in alignment with or slightly below the upper surface of the table 92 so that the plates cannot interfere with movement of the interior studs, fire stops, etc., as described. Clearly, the plates will be returned to their elevated positions after all of the members are in the assembly position upon the table 92 preparatory to a nailing operation.

As shown best in FIGS. 3, 8 and 9, the fastener mechanism at Station #2 is located above the table 92 and is selectively movable between the lower and upper positions shown in FIG. 9A by full lines and broken lines, respectively. The mechanism includes a perimetric main frame structure 139 of generally rectangular configuration which includes a pair of longitudinally extending side members 140 and 141 and a pair of transversely extending end members 142 and 143. All of such members 140–143 are of hollow tubular construction, and are rigidly interconnected with their interiors in flow communication. Such hollow interiors define a relatively large reservoir 144 adapted to be connected to a source (not shown) of pressure fluid, such as compressed air, used to energize the fastener mechanisms, as described hereinafter.

The main frame 139 is supported for vertical reciprocation by a plurality of motor means in the form of piston-cylinder structure—there being four such motor means in the apparatus illustrated, one for each corner of the frame 139 and respectively denoted with the numerals 145a through 145d. The cylinder of such motor means may be fixedly secured to the support base 106 and the piston rods to the main frame 139. It will be evident that the stroke of each motor means is ample in length to reciprocate the main frame 139 between the lower assembly position shown by full lines in FIG. 9A and the upper position shown by broken lines in such figure, which upper position permits various of the structural elements to be moved into the assembly station.

Releasably supported upon the main frame 139 is a sub-frame or carrier frame generally denoted 146. Such sub-frame carries the various fastener mechanisms and is necessarily constructed and designed to accommodate a particular building component. Thus, in the case of the wall frame 26, the sub-frame 146 is designed to provide fastener mechanisms at appropriate locations for connecting the various studs, plates, fire stops, etc., that comprise the wall frame. Should it be desired to alter the particular construction of such building frame 26, or to construct a different building component such as a roof truss, the sub-frame 146 can be replaced in its entirely with an alternate sub-frame of the appropriate design. Interchange of one sub-frame with another may be effected simply by lifting the sub-frame 146 from the main frame 139 and replacing the sub-frame with another.

The sub-frame 146 includes a plurality of longitudinally spaced and transversely extending supports, there being two shown in FIG. 8 and respectively designated with the numerals 147a and 147b. The elements 147a are provided adjacent the opposite ends thereof with downwardly facing arcuate seats adapted to rest upon the side members 140 and 141 of the main frame so as to be supported thereby. Such members 147 are also supported intermediate the tubular main frame members 140 and 141 by a plurality of transversely spaced and longitudinally extending intermediate supports 148a and 148b, each of which is rigidly secured at the opposite ends thereof to the end members 142 and 143 of the main frame 139. The sub-frame 146 also comprises a plurality of transversely spaced and longitudinally extending frame elements or carriers 149a and 149b respectively supported adjacent the main frame elements 148a and 148b, and it also comprises an intermediate element or carrier 149c. Thus, the sub-frame 146 is a relatively rigid component and is firmly supported by the main frame 139 due to its own weight. However, clamps, straps or other securing devices may be used to releasably connect the two frames 139 and 146, should this be necessary or desirable.

The sub-frame elements 149 respectively carry a plurality of guides that are useful in association with various studs of the wall frame. The guides are stationary elements and those provided by the frame members 149a, 149b and 149c are respectively denoted 150a, 150b and 150c. In the lowered position of the frames 139 and 146, the guides may serve as buttress members to back or reinforce at least certain of the studs and other building elements during the nailing operation. In this respect, the frame members 149a and 149c are respectively secured to and are carried by two pairs of lever arms 151a–151b and 152a–152b. The respectively associated arms 151 anwd 152 overlap adjacent the inner ends thereof, as shown most clearly in FIG. 8, and are pivotally supported by pins 153a and 153b respectively carried by brackets depending downwardly from the frame members 147a and 147b, as shown best in FIG. 9A. When the frame structures 139 and 146 are lowered into the position shown by full lines in FIG. 9A, the levers 151 and 152, in association with suitable linkage devices, cause the guide elements to be displaced into the buttress positions thereof, as shown. It will be apparent that the frame element 149b and guides 150b associated therewith are arranged to function in a like manner.

Carried by the frame elements 148a and 148b are a plurality of magazines respectively denoted with the numeral 154, the suffixes a and b being applied to appropriately associate such magazines with the two elements 148a and 148b. The magazines 154 may be conventional nailing dispensers and they can be bolted, welded or otherwise rigidly secured to the frame elements 148. It will be evident that a magazine 154 will be provided at each location where it is desired to interconnect the plates 29 and 30 with the corner and intermediate studs of the wall frame and, accordingly, the spacing between the magazines will correspond to the spacing between such studs.

The lowermost nail, denoted in FIG. 9A with the numeral 155a (appropriate suffixes again being used) in each magazine is adapted to be stripped therefrom by the hardened tip or nose of a driving bar 156a carried by a hammer lever 157a which is pivotally connected adjacent its lower end by a pivot pin 158a to the outer end of an elongated arm 159a pivotally supported intermediate the ends thereof on a pin 160a. The location of the pin 160a is fixed in that it is supported by the leg 107 of the base 106, and the arm 159a is pivoted about such fixed point by a piston-cylinder structure 161, the cylinder of which is carried by the base 106 and the piston rod of which is pivotally connected to the arm 159a by a pin 162. Energization of the piston-cylinder structure 161 is effective to raise or lower the vertical location of the pivot pin 158a and, accordingly, the vertical position of the driving bar 156a.

Evidently, the vertical position of the bar 156a is intended to correspond to the vertical position of the magazines 154a so as to strip the lowermost nails 155a therefrom. With respect to the positioning of the magazines and bar, they are selectively raised and lowered (the magazines by movement of the main frame 139) so that a plurality of nails can be used to secure the plates and studs at each location, as heretofore described with respect to the window frame sub-assembly 36, and the spacing between the nails may be about the same as in the prior example; namely, 1½ inches, and corresponds to the positions a, b and c indicated in FIG. 9A.

As is clear from inspection of FIG. 8, the bar 156a extends substantially the length of the frame element 148a carrying the magazines 154a so that nails are stripped from all of the magazines 154a substantially concurrently. The bar 156a and hammer lever 157a to which it is secured are reciprocated about the pivot pin 158a to effect a nailing operation by motor means 163a in the form of piston-cylinder structure. The cylinder of such motor means is supported by a ledge 164a provided by the base 106; and the piston rod of the motor means is connected to the lever 151a by a pin 165a. When the motor means 163a is energized, the lever 157a will be displaced inwardly whereupon the bar 156a will strip nails from the respective magazines 154a and will drive such nails through the plate 30 and into the various studs aligned with the nails. The bar is then returned to the position illustrated in FIG. 9A in preparation for the next nail-driving operation.

It will be apparent that it may be desirable to employ a plurality of longitudinally spaced motor means 163a so that a relatively uniform driving force will be applied all along the bar 156a, and the precise number of motor means will depend upon the size of the building component being fabricated and upon the power of each motor means. Further, the cylinder of each motor means 163a should be pivotally anchored to the ledge 164a by any conventional means effective to prevent displacement of the cylinder along the ledge while permitting slight angular displacements of the cylinder to accommodate raising and lowering of the bar 156a.

Similarly, the cylinder of the motor means 161 may be pivotally carried by the base 106 since the pin 162 must traverse a slight arc as the arm 158a is displaced to raise or lower the nose 156a. However, the length of the arm 159a is quite great relative to the vertical movement thereof so that any such arc is quite slight and could be accommodated by a somewhat elongated opening in the arm 159a for the pin 162. An identical arrangement is provided adjacent the opposite side of the frame components 139 and 146 and the same numerals are employed to identify corresponding components except that the suffix b is used with each such numeral.

The fire stops 34 are secured to the respectivey associated studs by a plurality of nailing units 166 that are carried by a tubular support 167 secured to the aforementioned supported elements 147a and 147b of the sub-frame 146. The nailing units 166 are angularly disposed, as shown in FIG. 8, to enable the same to angularly orient the nails to be driven through the fire stops and into the studs which are disposed at right angles with respect to the fire stops. The tubular support 167 is hollow and is in flow communication with each of the nailing units 166 which are fluid-actuated. Compressed air or other gaseous fluid is supplied to the interior of the tubular support 167 through a supply conduit 168 which at one end, is connected to the interior of the tubular frame element 141, as through a quick connector 169.

The nailing units 166 are conventional devices such as the Paslode Magnum T-Nailer or Stapler manufactured by the Paslode Division of Signode of Skokie, Ill.; or the Senco Jam-Proof Stapler-Nailer manufactured by Senco Products, Inc., of Cincinnati, Ohio. Additional nailing units of this type may be used elsewhere as necessary to secure sub-assemblies, door cripples, etc., and in FIG. 8, certain of such additional nailing units are shown and are denoted with the numeral 166a.

Following completion of the nailing operation at Station #2, the main conveyor 47 is actuated to advance the frame 26 forwardly one step and into Station #3 at which the corner braces 43 and 44 are positioned on the frame and are then secured thereto. In describing this latter function, reference will be made in particular to FIGS. 2, 15 and 16, and referring thereto it is seen that the corner braces are grouped in two packages P43 and P44 which are respectively disposed on opposite sides of the main conveyor 47. One such package P44 is shown in FIGS. 15 and 16 in association with the segregating and positioning mechanism therefor and the following detailed discussion will be directed thereto, it being understood that like apparatus is provided for the package P43, but has been omitted from the drawings for purposes of simplifying the same.

As shown in FIG. 15, the wall frame 26 has been advanced into Station #3 by the main conveyor and is supported thereat. Extending transversely across the wall frame 26 and conveyor 47 is a longitudinally disposed track in the general form of an I-beam 169 supported at the opposite ends thereof by a pair of motor means 170a and 170b which constitute piston-cylinder structures. The cylinders of the motor means are fixedly secured to the floor or other support surface, and the rods of the pistons are secured to the I-beam. Thus, the beam is selectively movable upwardly and downwardly by the motor means 170. The I-beam 169 is angularly disposed with respect to the frame 29 and, therefore, is essentially oriented in the same direction as the corner brace 44, as shown in FIG. 2.

Supported by the I-beam 169 for longitudinal displacements therealong is a carriage 171 equipped with a plurality of wheels or rollers 172 that ride on the lower flange 173 of the I-beam which actually defines a track therefor. Secured to the carriage 171 so as to be displaced therewith is an electric motor 174 that rotatably drives a dado saw 175 connected with the shaft of the motor so as to be driven thereby. Evidently, whenever the vertical position of the I-beam 169 is properly related to the frame 26, movement of the carriage 171 across the frame will cause the saw 175 to cut channels or recesses in the various studs to a depth sufficient to accommodate a corner brace 44.

Reciprocable movement along the I-beam 169 is enforced upon the carriage 171 by the drive motor 176 supported by the I-beam 169 and connected with a drive sprocket 177 so as to rotatably drive the same. Entrained about the drive sprocket 177 is an endless chain 178 which is also entrained about an idler sprocket 179. The lower leg of the chain 178 is fixedly connected to the carriage 171 so that relative movement therebetween is prevented and, therefore, whenever the drive motor 176 is energized, the chain 178 will cause the carriage 171 to move along the track defined by the I-beam. It is clear that the drive motor 176 is reversible so that it can selectively displace the carriage in each direction along the I-beam between the start and finish positions respectively shown in FIG. 15 by full and broken lines.

Also mounted for longitudinal movement along the track defined by the I-beam 169 is a carriage 180 which is equipped with a plurality of wheels or rollers 181 that ride on the lower flange 173 of the I-beam. The carriage 180 is spaced from the carriage 171 by about the length of a corner brace 44, and depending from the carriage 180 is an arm 182 that, at its lower end, terminates in a laterally oriented, longitudinally disposed pusher finger 183. The finger 183 in the position of the I-beam illustrated in FIGS. 15 and 16, which position corresponds to the cutting position of the saw 175, is alignable with a corner brace 44 and engageable with the end thereof to displace the same from its segregated position with respect to the package P44 and into the dado recesses along the frame 26 cut by the saw 175. The carriage 180 is fixedly secured to the lower leg of the endless chain 178, in the manner of the carriage 171, as by means of the fastener structure 184 shown in FIG. 16.

Corner braces 44 are segregated from the package P44 thereof by apparatus that is the same in all essential respects as the segregating mechanism heretofore described for the studs 31 and in which is shown in FIG. 5. Thus, the segregating mechanism for the corner braces 44 has a stationary guide wall 186 against which the forward column of corner braces is located, and a receiprocable gate 187 which is displaced by motor means 188 between the two positions shown by full lines and broken lines in FIG. 16 so as to permit the lowermost corner brace of such vertical column to be dropped downwardly therefrom and then displace the brace forwardly along the platform 189 to a position at which it can be engaged by the finger 183.

Also carried by the I-beam 169 are a plurality of nailing units 190 which can be substantially conventional and essentially the same as the aforementioned units 166. The units 190 are adapted to be lowered by the beam into adjacency with a corner brace 44 so as to nail the same to the various studs traversed thereby. Accordingly, the nailing units 190 will be appropriately spaced apart along the I-beam 169 so as to be in substantial alignment with the underlying studs and, then, a nailing unit will be included for each such stud. As shown in FIG. 15, a pair of limit switches 191 and 192 are respectively provided adjacent the opposite ends of the beam, and the first such switch is tripped by the carriage 171 in moving to the terminal position thereof shown by broken lines in FIG. 15. The switch 192 is tripped by movement of the carriage 180 from the terminal position shown by broken lines in FIG. 15 into the starting position thereof shown by full lines in such figure.

In a cycle of operation, the drive motor 176 is energized which results in the carriages 171 and 180 both being advanced toward the left, as viewed in FIG. 15, to respectively form dado cuts or recesses in the studs of the frame 26 and to displace a corner brace 44 into such recesses. Movement of the carriages in that direction is terminated by the limit switch 191, and after such movement is terminated, the beam 169 is lowered by the motor means 170 to bring the nailing units 190 into adjacency with the corner brace. Following the nailing operation, the beam 169 is elevated and the carriages 171 and 180 are returned to the starting position shown in preparation for a subsequent cycle of operation.

Prior to the main conveyor 47 being actuated to advance the wall frame 26 from Station #3 and into Station #4, a window 27 must be mounted in the window frame sub-assembly 36. The apparatus for effecting displacement of a window 27 from the package P27 thereof will now be described, and in connection therewith reference will be made in particular to FIGS. 3A, 7 and 20. As shown therein, a plurality of windows 193 are disposed with respect to each other invertical stacked relation (see FIG. 7 in particular), and each window in the form shown has a metal sash that is glazed or equipped with glass. The sash of each window is provided with a laterally extending flange 194 adapted to seat upon and be supported by a generally L-shaped channel 195 provided by a rack or magazine 196 which receives such stack of windows 193 therein. The rack at its lower end has a bottom wall or framework adapted to be supported upon the platform 197 of a hoist 198; and at its upper end, the rack 196 may have a top wall or closure 199 to protect the windows therein from damage and which may have an eye or hook element to enable the same to be connected to a crane.

The hoist 198 may be a hydraulic unit of conventional design and is located within a large depression or pit 200 that is provided along the main conveyor 47 in laterally spaced relation therewith. Located above the pit 200 and along the side thereof remote from the conveyor 47, is a motor means 201 in the form of an elongated piston-cylinder structure, the rod-equipped piston of which is adapted to extend into the rack 196 and displace a window 193 outwardly therefrom and onto the building frame 26 and into proper position with respect to the window frame sub-assembly 36 thereof. The building frame 26 is indicated somewhat diagramamtically in FIG. 20 and is illustrated to show the relationship of the rack 196, motor means 201 and building frame.

Located along the rack 196 so that the actuator arm thereof can be engaged by a window 193 mounted therein is a limit switch 202 which may be fixedly supported on the cylinder 201, or otherwise supported, so that the rack 196 and windows therein are vertically displaceable with respect to the switch. The switch controls the motor means 198 and is operative to energize the same after each uppermost window has been displaced from the rack 196 to cause the rack to be raised one step and thereby position the next successive window in alignment with the cylinder 201 so that such successive window can be displaced from the rack in a subsequent cycle of operation. The motor means 201 is supported on a longitudinally extending track (FIG. 3A) comprising a pair of channels or recesses 203 and 204 which enable the cylinder to be appropriately positioned in a longitudinal sense with respect to the rack 196. It is apparent that the motor means 201 will be energized to displace a window 193 from the rack 196 and into proper position with respect to the window frame sub-assembly 36 of a wall frame when such frame is in Station #3. Accordingly, such placement of the window will occur about the same time that the corner braces 43 and 44 are positioned upon the frame studs and secured thereto, as heretofore described.

After such mounting of a window 193 and the corner braces 43 and 44, the main conveyor 47 is actuated to advance the wall frame 26 from Station #3 and into Station #4. In advancing the frame 26 into Station #4, a vapor barrier is positioned along the frame in overlying relation therewith, and in explaining this operation, particular reference will be made to FIGS. 3A, 3B and 17. Referring thereto, it is seen that the vapor barrier may be provided in roll form and may be comprised of any of the conventional materials used as vapor barriers, such as impregnated building paper, polyethylene film, etc. In FIG. 17, the vapor barrier web is denoted with the numeral 45 and the entire roll thereof as R45.

The roll R45 has a hollow center through which may be extended a shaft 207 useful in lifting the roll and which also can serve as a weighting guide therefor, especially as the roll becomes depleted. In this respect, the shaft is loosely received within the open center of the roll and bears downwardly thereagainst, and the ends of the shaft are slidably received within vertically disposed slots 208 formed in a machine frame 209. The roll R45 of the vapor barrier seats upon a pair of rollers 210 and 211 that are rotatably supported by the machine frame 209 and extend transversely across the main conveyor 47. Accordingly, the roll R45 also extends transversely of the main conveyor, as is most evident in FIG. 2. The rollers 210 and 211 are respectively equipped with shafts 212 and 213 to which are keyed sprockets 214 and 215. Entrained about such sprockets is an endless chain 216 which is also entrained about a drive sprocket 217 coupled by an electric clutch 217a to a shaft 218 forming a part of the main conveyor 47 and to which the chain 48b is drivingly connected by the aforementioned sprocket 53.

As shown in FIG. 17, the machine frame 209 rotatably supports the shaft 218 and seats upon the underlying floor or other support surface. Clearly, there are two machine frame components respectively located on opposite sides of the main conveyor 47 so that the roll of vapor barrier straddles the same. The upper reach of the main conveyor is adapted to advance wall frames 26 beneath the roll R45, as shown in FIG. 17, and the rollers 210 and 211 in being drivingly connected to the main conveyor are rotated at a corresponding velocity to pay out a sufficient length of the vapor barrier web 45 to completely cover one side of the wall frame 26 as it is advanced from Station #3 into Station #4. Each wall frame 26 is advanced from left to right, as viewed in FIG. 17, and a wall frame commencing to be displaced beneath the roll R45 is shown by broken lines and with the leading corner stud 41 thereof in engagement with the actuator arm of a switch 219 supported by the machine frame 209. The switch 219 controls such clutch 217a which is a conventional electrically-controlled clutch adapted to selectively couple the sprocket 217 with the shaft 218 to initiate rotation of the rollers 210 and 211. Thus, the rollers 210 and 211 are stationary until a wall frame 26 has been advanced into engagement with the actuator arm of the switch 219, at which time the rollers 210 and 211 are energized so as to pay out the web 45.

As the wall frame 26 continues to be advanced by the main conveyor 47, the carrier 131b (FIG. 13), which abuts the frame along the trailing corner stud 42 thereof, engages a limit switch 200 supported by the machine frame 209 in alignment with the depending lug of such carrier, and actuation of the limit switch 220 energizes a motor means 221 in the form of piston-cylinder structure having a piston rod that reciprocates a knife blade 222 supported for vertical reciprocatory displacements by a guide sleeve 223. The reciprocable blade 222 extends transversely of the web 45 and is located therebelow, and is adapted to engage the underside of such web and in cooperation with a stationary anvil 224 severs such web. The location of the line of severance is spaced slightly from the trailing corner stud 42, which trailing corner stud is in the approximate position illustrated in FIG. 17 by the full line showing of the wall frame 26.

The length of web 45 is sufficient to extend downwardly along the stud 42 so that the trailing flap or end of the vapor barrier can be secured thereto. In this respect, a tacking or stapling (e.g., Bostitch stapler) mechanism, generally denoted 225, displaces such trailing flap of the web downwardly and into juxtaposition with the stud 42 and then drives a sufficient quantity of tacks through such barrier and into the corner stud so as to secure the trailing flap of the vapor barrier thereto. The tacking mechanism 225 includes a bar 226 extending transversely across the conveyor 47, and adjacent its opposite ends, the bar is secured to arms 227 pivotally supported on a shaft 228.

The arms 227 are movable between a retracted position shown by full lines in FIG. 17, and a tacking position shown by broken lines, and such movement of the tacking mechanism is controlled by a piston-cylinder structure 229, the cylinder of which is secured to the machine frame 209 and the piston rod 230 of which is pivotally connected to one of the arms 227. Secured to the bar 226 in spaced apart relation therealong are a plurality of conventional tacking units 231 which are made operative when the mechanism 225 is in the tacking position, shown by broken lines, so as to nail or tack the trailing end of the web 45 to the stud 42.

A second tacking mechanism 232 is used in an analogous manner to secure the leading flap of the web 45 to the next successive wall frame 26. In a corresponding manner, such tacking mechanism 232 includes a bar 233 that extends transversely of the main conveyor 47 and is carried at its opposite ends by arms 234. The arms are supported by a shaft 235 so as to rotate therewith, and the shaft is pivotally supported by the machine frame 209. The mechanism 232 is movable between the retracted position (full line showing) and the tacking position (shown by broken lines), and movement between these two positions is enforced upon the mechanism by a piston-cylinder structure 236, the cylinder of which is carried by the frame 209 and the piston rod of which is pivotally connected by a pin 237 to an arm keyed or otherwise secured to the shaft 235 so as to enforce angular displacements thereon. The bar 233 is equipped with a plurality of tacking units 238 of conventional design adapted to nail the leading flap of the web 45 to the corner stud 41 of a wall frame 26.

Operation of the piston-cylinder structure 236 is controlled by the switch 219 which, as indicated hereinbefore, also initiates rotation of the rollers 214 and 215. Termination of the rotational movement of the roller 214 and 215 is controlled by a switch 239 which is engaged by the carrier 131b and de-energizes the electrically-controlled clutch 217a which, when energized, drivingly connects the chain 216 with the conveyor 47.

The vapor barrier is sufficiently wide to extend entirely across the wall frame 26 essentially from the plate 29 to the plate 30 thereof; and since it is payed out continuously as the building wall frame moves from Station #3 to Station #4, the vapor barrier necessarily extends along the entire length of the frame and, in fact, is secured to each of the corner studs thereof. Consequently, the vapor barrier extends over the window area and door area of the frame. Such overlying extension of the vapor barrier is advantageous during a subsequent operation where the wall section is sprayed with a coating material because the vapor barrier is effective at that time to protect the window and also the door area from the spray material. However, it is desirable to provide for the removal of the vapor barrier from the window area, and this is accomplished in the present apparatus by severing the vapor barrier both longitudinally and transversely along the marginal areas of such window.

Considering such severance, a pair of spaced apart cutting knives 240a and 240b of circular configuration are supported upon the aforementioned shaft 228 so as to rotate freely with respect thereto. The knives 240 are spaced apart with respect to each other and are located so as to define essentially the longitudinal edges of the window area. The knives are further positioned so that they engage and traverse the web 45 as it is drawn forwardly by a wall frame 26, and thereby sever the web along the edges of the window which serves as an anvil for the knives. The web 45 is relatively taut at this time, as shown in FIG. 17, and the path of its movement is over an idler roller 241 journalled for rotation in the machine frame 209. The knives 240 are suitably mounted to enable the same to be elevated except at the location of the window.

Figure 3B:
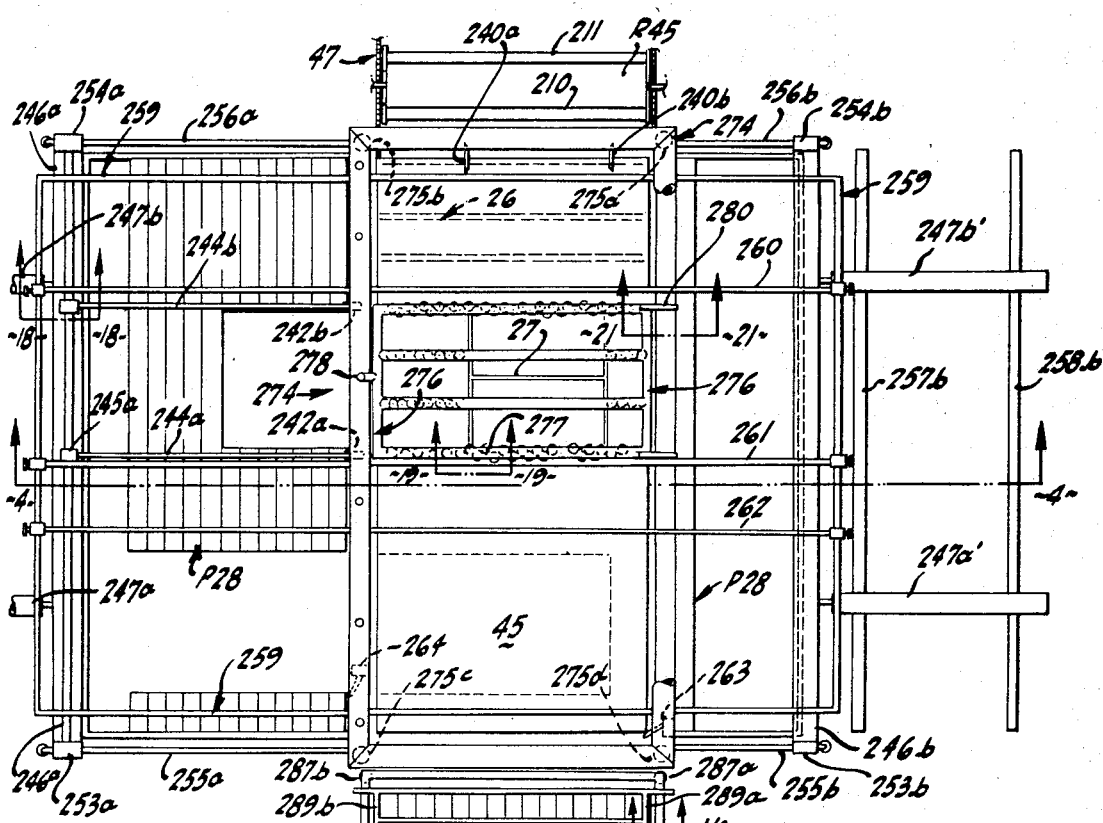
FIG. 3B is an enlarged, broken, top plan view illustrating the siding mounting, recess filling, and coat-applying stations.

The vapor barrier 45 is severed transveresly along the marginal edges of the window by the apparatus illustrated best in FIGS. 3B, 18 and 19. Such severing apparatus includes a pair of cutting knives 242a and 242b, each of which is of circular configuration and has a sharpened circumferential cutting edge, shown at 243 in FIG. 19. The knives 242 are respectively mounted upon the inner ends of a pair of transversely extending bars or carrier frames 244a and 244b and are freely rotatable with respect thereto. The carriers 244, at their outer ends, are respectively provided with mounting heads 245a and 245b which are mounted upon a longitudinally extending push bar 246a. Any suitable means of interconnecting the mounting heads 245 and push bar 246a may be used, such as the dove-tail connection illustrated in FIG. 18 which permits the carriers 244 to be adjustably located along the length of the push bar.

Connected with the push bar 246a so as to displace the same transversely relative to the main conveyor 47 are a pair of motor means 247a and 247b in the form of piston-cylinder structures, the cylinders of which are fixedly located and the rod-equipped pistons of which are connected with the push bar. Evidently, whenever the motor means 247 are energized, the push bar 246a will be displaced inwardly toward the main conveyor 47 and, as a consequence, the carriers 244 and cutting knives 242 will be displaced thereby Such displacement is intended to occur whenever a wall frame 26 is in position at Station #4 and has a vapor barrier extended over one side thereof. At this time, as the knives 242 traverse such barrier in substantial alignment with the transverse edges of the window, the knives will sever the vapor barrier because the edges of such window serve as the anvil for the knives. The knives 242 and carriers 244 therefor are suitably mounted to enable the knives to be elevated except at the location of the window.

The siding 28 is mounted upon the frame 26 at Station #4, and the mechanism for positioning the siding upon the frame is illustrated in FIGS. 3B, 4, 18 and 21, and reference will be made thereto in particular in describing this operation. As shown best in FIG. 4, two packages or groups of siding are provided, one along each side of the main conveyor 47. Each group comprises lumber or board planks arranged in a plurality of vertically stacked, horizontal rows, each row of which includes all of the individual boards or planks required to cover a predetermined area along one side of the wall frame 26. In the particular arrangement illustrated, the individual boards are slotted along one edge and are provided with a tongue along the opposite edge thereof so that the boards comprising one horizontal row are interfitted with the tongue of one board being received within the slot of the adjacent board, as shown in FIG. 18. Any one composite horizontal row comprised by the two packages P28 respectively disposed along opposite sides of the main conveyor are sufficient to completely cover one side of the frame 26, as shown more clearly in FIG. 2.

The package P28 located along the chain 48a of the main conveyor is supported upon a pallet 248a positioned upon a horizontally disposed platform 249a of a hoist 250a which may be a conventional hydraulically-actuated hoist. The hoist is located within a large depression or pit 251a disposed along one side of the main conveyor, and the hoist is operative to elevate the group P28 in a step-by-step manner to maintain each successive uppermost horizontal group of boards 28 at a predetermined elevation such as to enable the same to be displaced from the package and onto the wall frame 26. Thus, the arrangement is analogous to the mechanism described heretofore with respect to the windows 193, as illustrated most clearly in FIG. 20. A substantially identical arrangement is provided for the package P28 on the opposite side of the conveyor (i.e., along the chain 48b thereof), and the same numerals are used to identify corresponding components except that the suffix b is used with such numerals.

The aforementioned push bar 246a is adapted to be displaced inwardly and into engagement with the adjacent board 28 in the uppermost horizontal row thereof and thereby displace such row inwardly toward the conveyor 47 and onto the wall frame 26 supported thereon at Station #4. To guide the push bar 246a during reciprocable displacements thereof, the bar adjacent its opposite ends is equipped with cross-heads 253a and 254a which are respectively arranged with slideways 255a and 256a. The respectively associated cross-heads and guideways constrain to push bar 246a against longitudinal and vertical movements while enabling the same to be reciprocated transversely along a well defined path.

Figure 4:
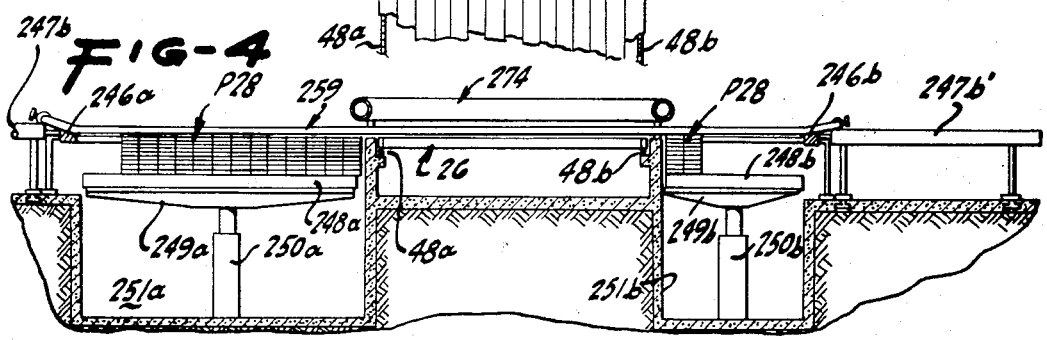
FIG. 4 is a broken, transverse sectional view taken along the line 4—4 of FIG. 3B.

An essentially identical push bar arrangement is provided along the opposite side of the main conveyor to cooperate with the package P28 supported upon the hoist 250b, and the respectively corresponding components are denoted with the same numbers but with the suffix b added thereto, except in the case of the motor means 247a and 247b in which case the primed form of such numerals are employed. The motor means 247 may be supported upon trackways to facilitate mounting and adjustment thereof, and such trackways are shown in FIGS. 3B and 4 in association with the motor means 247a' and 247b', and are denoted with the numerals 257b and 258b.

Extending across the conveyor 47, across the two packages P28 on opposite sides thereof, and over the push bars 246a and 246b, is a generally rectangular hold-down frame denoted in its entirety with the numeral 259. The lowermost position of the frame 259 is determined by engagement of the longitudinally extending components thereof with the various motor means 247, and the frame is adapted to substantially abut the uppermost row of boards 28 when such boards are in a position to be displaced inwardly by the push bars 246. In the particular structure shown, the hold-down frame has a plurality of transversely extending intermediate elements 260, 261 and 262 which are spaced from each other and from the transverse end members of the hold-down frame by distances sufficient to cooperate with the board distribution of the underlying packages P28.

It will be evident that when a wall frame 26 has been moved into Station #4, the various motor means 247 will be energized to displace the push bars 246 inwardly. The motor means may be controlled in any appropriate manner, as by means of a limit switch 263 (FIG. 3B) having an actuator arm adapted to be engaged by the leading end stud of such frame when the frame is properly located at Station #4. Inward displacement of the push bar 246a will cause the cutting knives 242 to sever the vapor barrier 45 transversely as heretofore described, and inward displacement of such push bar will continue until all of the boards or panels 28 constituting the uppermost horizontal row in the package or packages located along the chain 48a are properly positioned upon the wall frame 26.

Concurrently therewith, the push bar 246b will be displaced inwardly to similarly locate upon the wall frame 26 the uppermost panels 28 from the package or packages P28 thereof along the conveyor chain 48b. After the various cylinders 247 are moved through their return strokes to retract the two push bars 246, the hoists 250a and 250b are elevated one step to position the packages supported thereon so that the uppermost rows of boards 28 are aligned with the push bars 246 to enable such upper rows to be displaced inwardly in the succeeding cycle of operation. The hoists 250 may be controlled in any suitable manner, such as by a switch 264 (FIG. 3B) having an actuator arm adapted to be engaged by the uppermost row of boards 28 only when such uppermost row is properly positioned in alignment with the push bars 246.

Means are provided in the apparatus to facilitate or ease movement of the boards 28 over the vapor barrier 45 covering the frame 26, and such means constitutes the provision of a lubricating layer of gas intermediate the upper surface of the vapor barrier 45 and undersurface of the boards 28, and the mechanism by which such lubrication is provided is illustrated in FIG. 21. Referring thereto, it is seen that Station #4 is defined in part by the conveyor chain 48b which, at such station, is supported upon an upwardly extending slide or plate 265 mounted upon a transversely extending channel or beam 266 forming a component of the main base frame of the apparatus. The component 266 is supported by one or more of the aforementioned legs 107 of such base frame, and a longitudinal extending I-beam 267 may extend across the top of the transverse component 266 and provides an intermediate support for the wall frame 26. Pivotally supported by the slide member 265 through the agency of a bifurcated bracket 268 and pivot pin 269 is a bell crank 270 that is resiliently biased into the position shown by full lines in FIGS. 21 by a compression spring 271.

In the usual case, there will be a plurality of bell cranks 270 provided along the main conveyor in longitudinally spaced relationship, each of which is connected with and supports a longitudinally extending pipe or conduit 272 adapted to deliver compressed air or other gaseous fluid (by connection to the aforementioned source thereof, not shown) to a plurality of nozzles 273 spaced apart longitudinally therealong. The nozzles 273 may be resilient and, in the innermost position thereof shown in FIG. 21, which position is enforced thereon by the springs 271, the nozzles are in juxtaposition with the upper surface of the vapor barrier 45 and are adapted to eject a stream of air that forms the lubricating layer or film of gas along the upper surface of the vapor barrier. Such film of lubricating air, it will be apparent, is effective to facilitate sliding motion of the boards 28 along the web 45 as the boards are displaced thereover by the push bars 246.

After the boards 28 have all been properly positioned upon the frame 26 in overlying relation with the vapor barrier 45 thereon, it is necessary to secure the boards to the various studs, plates, etc. The apparatus by which this is accomplished is quite similar to the nailing mechanism described in detail hereinbefore with particular reference to FIGS. 8 and 9A. Accordingly, the present description may be abreviated somewhat and will be referenced to FIGS. 3B, 4 and 21 in particular. Referring thereto, it is seen that a main frame structure 274 is provided which is of generally rectangular configuration and is of hollow tubular construction with the interiors of all of the four branches thereof being in flow communication. Such hollow interiors define a relatively large reservoir adapted to be connected to a source (not shown) of pressurized fluid, such as compressed air, used to energize the various fastener mechanisms employed to secure the boards 28 to the frame studs, etc.

The main frame 274 is supported for vertical reciprocation by a plurality of motor means in the form of piston-cylinder structures—there being four such motor means in the apparatus illustrated, one for each corner of the frame and respectively denoted with the numerals 175a–175d. Releasably supported upon the main frame 274 is a sub-frame or carrier frame 276 which is shown in FIG. 21 but has been omitted in FIGS. 3B and 4 for purposes of simplification. Such sub-frame 276 carries the various fastener mechanisms 277 and is necessarily constructed and designed to accommodate a particular building component. Thus, in the case of the wall frame 26, the sub-frame 276 is designed to provide fastener mechanisms 277 at appropriate locations for connecting the boards 28 to the underlying studs, plates, etc., that comprise the wall frame. The sub-frame 276 is releasably supported upon the main frame 274 so that interchange of one sub-frame with another may be effected simply by lifting the sub-frame from the main frame and replacing it with another.

The fastener mechanisms 277 may be conventional nailing units as described hereinbefore; and they are gaseous fluid actuated and are in flow communication with the interior of the sub-frame 276 which is hollow to define a flow path for the actuating fluid to the various nailing units. The hollow interior of such sub-frame 276 may be connected to the hollow interior of the main frame 276, as by means of a flexible coupling 278 and quick connector 279. As shown in FIG. 21, the sub-frame 276 may rest upon the main frame 274 and to stabilize the structural relationship of these two frame members, a plurality of hangers 280 may be rigidly secured to the sub-frame 276 and designed to overhang and seat upon the main frame 274.

Evidently, the main frame 274, and therefore the sub-frame 276 carried thereby, is adapted to be raised and lowered by appropriate actuation of the motor means 275, and the frames are lowered after the boards 28 have been positioned upon the wall frame 26 to bring the nailing units 277 into operative engagement with the boards 28. As the frames are lowered, the main frame 274 is moved into the position thereof illustrated by broken lines in FIG. 21; and in moving downwardly, a pawl 281 pivotally carried by a bracket 282 secured to the main frame 274 is adapted to engage an upwardly extending ear provided by the bell crank 270 so as to displace it outwardly and into the position shown by broken lines in FIG. 21. It will be apparent that a pawl 281 will be provided for each bell crank 270 so that a relatively uniform displacement force will be applied to the conduit 272 along the length thereof. It may be noted that nozzle structure, such as that shown in FIG. 21 and described in detail, will be provided along the opposite side of the conveyor to provide a lubricating film for the boards 28 that are displaced onto the frame 26 from such opposite side of the conveyor. Since such additional fluid-lubricating mechanism is essentially the same as that described and illustrated, it is not shown in the drawings for purposes of simplifying the same.

Usually, the nails that are driven into the siding boards 28 by the nailing units 277 have their heads recessed slightly into the boards 28, as shown in FIGS. 11A and 11B. In the apparatus being considered, means are provided for filling such recesses so that the exterior surface of the wall section is substantially smooth. In FIGS. 11A and 11B, the nails illustrated therein are denoted for identification with the numeral 284; and each nail is seen to be driven through a board 28 and into an underlying frame component, such as a plate 29 and the studs of the wall frame 26. The recesses formed by the heads of the nails being depressed into the boards are denoted with the numeral 285.

The hole filling operation is effected after the wall section has the siding 28 secured thereto and is moved outwardly from Station #4. The nail filling apparatus, as seen best in FIG. 3B, includes a main frame 286 of generally rectangular configuration formed of hollow tubular members and supported at the four corners thereof with piston-cylinder motor means, two of which are illustrated in FIG. 3B and are denoted 287a and 287b. The frame 286 may be rasied and lowered by the motor means 287 in the manner of the frames 274 and 139 heretofore described. The main frame 286 is adapted to be connected in flow communication with a source of quick drying, viscous or semi-fluid caulking compound or other suitable hole filling material; and such source thereof will be suitably pressurized so as to express the material into the hollow interior of the frame 286 and maintain the material under pressure therein.

Releasably mounted upon the main frame 286 is a sub-frame, generally denoted 288, comprising longitudinally extending hollow tubular members 289a and 289b and a plurality of longitudinally spaced and transversely extending cross-members 290. Each of the cross-members 289 is a hollow tube the interior of which is in open communication with the hollow interiors of the tubular members 289a and 289b, as shown in FIG. 11A. The member 289a is in flow communication with the interior of the main frame 286 through a coupling 291 and quick connector 292. Accordingly, each of the transversely extending members 290 has a supply of caulking material continuously delivered thereto.

Each of the transversely extending conduit members 289 is equipped at spaced apart locations therealong with split collars 293 that may be opened slightly so as to slide over and along the associated conduit, and which can be clamped in selected positions therealong, as by means of a screw 294. Each tube or conduit 290 has a plurality of spaced apart discharge openings 295 formed in the lower surface thereof which have respectively aligned therewith openings 296 of slightly smaller size in the adjacent collars 293. Each set of aligned or registering openings 295–296 is adapted to have a caulking compound ejected therethrough, and they are adapted to be selectively covered and uncovered by an elongated slide valve 297 of somewhat U-shaped configuration in cross-section, as seen in FIG. 11B. The valve 297 is constrained against movement in all directions relative to the associated tube 290 except axially therealong; and in order to acomplish this result, each collar 293 has an enlarged base 298 that conforms to the cross-sectional configuration of the valve 297 and is slidably received therein.

The valve 297 has a plurality of spaced apart openings 299 formed therealong which are respectively alignable, selectively, with the various openings 296 in the collars 293. The valve 297 is movable between the open position thereof illustrated in FIG. 11A in which the openings 299 therein are aligned with the superjacent openings 299 in the collars 293, and a closed position displaced toward the right and into the position illustrated by broken lines in FIG. 11A. Reciprocable displacements between the open and closed positions thereof are imparted to the slide valve 297 by a motor means 300 in the form of piston-cylinder structure, the rod 301 of which is connected to the slide valve by a connector pin 302. The cylinder of the motor means 300 may be fixedly connected to the frame member 289a, as shown.

As is apparent from FIGS. 11A and 11B, the cross-tubes 290 are oriented and disposed so as to respectively align with the various rows of nails driven into the siding 28 by the nailing units 277 and, further, the openings 295–296 along each tube 290 are spaced so as to conform to the spacing between successive nails 284 in any one row thereof. When the wall section is properly positioned beneath the frames 286 and 288, such frames are lowered from an elevated position that provides sufficient clearance for the wall section to move along the main conveyor 47 to the lowered position shown in FIGS. 11A and 11B in which the slide valve 297 is in abutment with the upper surface of the siding 28. The slide valve 297 is then displaced to the open position thereof by the motor means 300, whereupon the pressurized caulking material within the tube 290 is expressed into the aligned recesses 285 in the siding 28.

The slide valve is maintained in the open position thereof only momentarily and is immediately returned to its closed position by operation of the motor means 300 in the opposite direction through the return stroke thereof. The motor means 287 then elevate the frames 286 and 288 to enable the wall section to be further advanced along the main conveyor. Suitable limit switches are appropriately located so as to terminate advancement of the wall section when the rows of nails in the siding thereof are aligned with the various tubes 290, and to energize the motor means 287 to lower and then raise the frames 286 and 288 to enable the recesses 285 to be filled. Similarly, a limit switch may be actuated by downward displacement of the frame 286 to energize each motor means 300 through a cycle of operation to open and close the slide valve 297 associated therewith.

After the nail holes or recesses 285 have all been filled, the wall section or building component 25 is essentially completed but may have a coating of paint or other preservative applied thereto. In the apparatus illustrated, a priming coat of paint is applied onto the exterior surface of the siding 28 by a plurality of spray heads 303 which are supplied from a manifold 304 that extends transversely across the conveyor 47 in spaced relation with each wall section 25 being advanced therealong, as shown in FIG. 2. Since the vapor barrier 45 covers the window 27, the spraying operation may be carried on continuously as the wall section 25 is advanced beneath the manifold 304 and spray heads thereon, the operation of which is controlled by a valve 303. The manifold 340 will be supplied with paint from a suitable source (not shown), and limit switches and solenoid-controlled valve means may be used to effect automatic operation of the paint spraying mechanism.

GENERAL OBSERVATIONS

For the sake of simplification, the electric and fluid (both hydraulic and air) circuits by means of which the various mechanisms of the overall apparatus are actuated and controlled have been omitted and, therefore, in most instances the electric valves (i.e., solenoid-controlled valves) are not illustrated—it being understood that such devices will be provided where appropriate in the electro-fluid circuitry. Control circuitry of the type appropriate to the subject apparatus is completely conventional and, therefore, no need exists to further consider the details thereof. The various limit switches employed throughout the apparatus are also conventional devices and to a large measure will simply be the usual micro-switches having actuator arms that are engaged by some moving component to change the condition of the switch and thereby alter the state of the electric circuitry employing the same.

As respects operation of the apparatus, it is believed that an overall cycle of operation is clear from the foregoing detailed description, especially in view of the general description which, in a large measure, is an explanation of the overall operational cycle. Accordingly, a further recital of a complete cycle of operation will not be set forth. It may be noted that a plurality of building components can be fabricated concurrently along the conveyor 47, which concurrency is depicted somewhat in FIG. 2 in that each of the Stations, #1 through #5, has a building component located thereat in the state of fabrication defined by such stations.

The apparatus enables building components to be fabricated at exceedingly high rates of speed and essentially without manual intervention. With respect to the rate of fabrication, an entire building component (such as a wall section) can be completely fabricated ready for erection at a building site in only a few minutes where, in the past, it has taken many hours to construct a corresponding building component at such site. In part, the exceedingly high fabrication rate is due to the concurrent construction of a plurality of building components at the various stations of the apparatus, and because one operation follows automatically upon the completion of a prior operation.

While in the foregoing specification an embodiment of the invention is set forth in considerable detail for purposes of making a complete disclosure thereof, it will be apparent to those skilled in the art that numerous changes may be made in such details without departing from the spirit and principles of the invention.

What is claimed is:

1. In apparatus for prefabricating a wall section or the like having a wall frame including a plurality of longitudinally spaced and transversely extending studs, means for equipping such wall frame with angularly disposed corner braces comprising beam structure oriented to extend across such wall frame in angular disposition with respect thereto and in spaced relation therewith, saw structure supported upon said beam structure and being longitudinally movable therealong and adapted to form recesses in such studs sized to receive such corner braces therein, a carriage supported by said beam structure and being longitudinally movable therealong and adapted to displace a corner brace along the wall frame and into the recesses in the studs thereof formed by said saw structure, and power means for reciprocating said saw structure and carriage longitudinally along said beam structure.

2. The apparatus of claim 1 and further comprising motor means supporting said beam structure for selective movement toward and away from such wall frame.

3. The apparatus of claim 2 in which a plurality of nailing units are carried by said beam structure and are operative to fasten such corner brace to the respectively associated studs when said beam structure is positioned toward such wall frame to bring said nailing units into juxtaposition with such corner brace.

4. The apparatus of claim 1 and further comprising segregating mechanism adapted to receive a package of such corner braces therein and being operative to successively segregate corner braces from the package thereof to provide the aforesaid carriage with a corner brace, said carriage being adapted to displace said corner brace along said wall frame and into the recesses of said studs.

References Cited

UNITED STATES PATENTS

| | | |
|---|---|---|
| 1,236,842 | 8/1917 | Johnson. |
| 3,212,694 | 10/1965 | Sanford _____ 227—152 |
| 3,225,434 | 12/1965 | Van Derlely et al. |
| 3,399,445 | 9/1968 | Carroll. |

THOMAS H. EAGER, Primary Examiner

U.S. Cl. X.R.

29—200, 211; 227—152